(12) United States Patent
Yu et al.

(10) Patent No.: US 12,166,999 B2
(45) Date of Patent: Dec. 10, 2024

(54) OPERATION RANGE EXTENSION FOR VERSATILE VIDEO CODING

(71) Applicant: INNOPEAK TECHNOLOGY, INC., Palo Alto, CA (US)

(72) Inventors: Yue Yu, Palo Alto, CA (US); Haoping Yu, Palo Alto, CA (US)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 18/435,257

(22) Filed: Feb. 7, 2024

(65) Prior Publication Data
US 2024/0179323 A1   May 30, 2024

Related U.S. Application Data

(63) Continuation of application No. PCT/US2022/075507, filed on Aug. 26, 2022.
(Continued)

(51) Int. Cl.
*H04N 19/152* (2014.01)
*H04N 19/169* (2014.01)
(Continued)

(52) U.S. Cl.
CPC ......... *H04N 19/152* (2014.11); *H04N 19/186* (2014.11); *H04N 19/1883* (2014.11); *H04N 19/70* (2014.11)

(58) Field of Classification Search
CPC .. H04N 19/132; H04N 19/172; H04N 19/174; H04N 19/186; H04N 19/30; H04N 19/423; H04N 19/70
See application file for complete search history.

(56) References Cited

U.S. PATENT DOCUMENTS

2017/0064336 A1   3/2017   Zhang et al.
2020/0404301 A1*  12/2020  Li ..................... H04N 19/55
(Continued)

FOREIGN PATENT DOCUMENTS

WO   2021061489 A1   4/2021
WO   2021136533 A1   7/2021

OTHER PUBLICATIONS

"The High-Level Syntax of the Versatile Video Coding (VVC) Standard"—Ye-Kui Wang et al., IEEE Transactions on Circuits and Systems for Video Technology, vol. 31, No. 10, Oct. 2021 (Year: 2021).*

(Continued)

*Primary Examiner* — Mainul Hasan
(74) *Attorney, Agent, or Firm* — Hodgson Russ LLP

(57) ABSTRACT

A video decoder decodes a video from a video bitstream encoded using Versatile Video Coding (VVC). The video decoder determines a bit depth of samples of the video based on Sequence Parameter Set (SPS) syntax element sps_bit-depth_minus8 whose value is in the range of 0 to 8. The decoder further determines the size of a decoded picture buffer (DPB) based on a Video Parameter Set (VPS) syntax element vps_ols_dpb_bitdepth_minus8 whose value is in the range of 0 to 8. The decoder allocates a storage space with the determined size of the DPB, decodes the video bitstream based on the determined bit depth, and thus obtains and stores a decoded picture in the DPB. The decoder further outputs the decoded picture.

12 Claims, 12 Drawing Sheets

Related U.S. Application Data

(60) Provisional application No. 63/262,078, filed on Oct. 4, 2021, provisional application No. 63/251,385, filed on Oct. 1, 2021, provisional application No. 63/260,600, filed on Aug. 26, 2021.

(51) Int. Cl.
*H04N 19/186* (2014.01)
*H04N 19/70* (2014.01)

(56) References Cited

U.S. PATENT DOCUMENTS

| | | | |
|---|---|---|---|
| 2022/0103865 A1* | 3/2022 | Wang | H04N 21/85406 |
| 2022/0239945 A1* | 7/2022 | Oh | H04N 13/161 |
| 2023/0023356 A1* | 1/2023 | Wang | H04N 19/70 |
| 2023/0269384 A1* | 8/2023 | Wang | H04N 19/172 |
| 2024/0048768 A1* | 2/2024 | Hendry | H04N 19/172 |
| 2024/0056618 A1* | 2/2024 | Hendry | H04N 21/2343 |

OTHER PUBLICATIONS

"Developments in International Video Coding Standardization After AVC, With an Overview of Versatile Video Coding (VVC)"— Benjamin Bross et al., Proceedings of the IEEE ( vol. 109, Issue: 9, Sep. 2021); Date of Publication: Jan. 19, 2021. (Year: 2021).*

Bross et al., "Versatile Video Coding Editorial Refinements on Draft 10," Joint Video Experts Team (JVET) of ITU-T SG 16 WP 3 and ISO/IEC JTC 1/SC 29, JVET-T2001-v2, Oct. 7-16, 2020.

Bossen et al., "VVC operation range extensions (Draft 4)," Joint Video Experts Team (JVET) of ITU-T SG 16 WP 3 and ISO/IEC JTC 1/SC 29, JVET-W2005-v3, Jul. 7-16, 2021.

Rusanobskyy et al., "CE-related: On history-enhanced method of Rice parameter derivation for regular residual coding (RRC) at high bit depths," Joint Video Experts Team (JVET) of ITU-T SG 16 WP 3 and ISO/IEC JTC 1/SC 29, JVET-V0106, Apr. 20-28, 2021.

WIPO, International Search Report and Written Opinion for International Application No. PCT/US22/75507, Dec. 6, 2022.

WIPO, International Search Report and Written Opinion for International Application No. PCT/US22/75497, Jan. 27, 2023.

WIPO, International Search Report and Written Opinion for International Application No. PCT/US22/75502, Jan. 26, 2023.

* cited by examiner

OPERATION RANGE EXTENSION FOR VERSATILE VIDEO CODING

CROSS-REFERENCE TO RELATED APPLICATIONS

This application is a continuation of International Application No. PCT/US2022/075507, filed Aug. 26, 2022, which claims priority to: U.S. Provisional Application No. 63/260,600, filed Aug. 26, 2021; U.S. Provisional Application No. 63/262,078, filed Oct. 4, 2021; and U.S. Provisional Application No. 63/251,385, filed Oct. 1, 2021. The entire disclosures of the aforementioned applications are incorporated herein by reference.

TECHNICAL FIELD

This disclosure relates generally to computer-implemented methods and systems for video processing. Specifically, the present disclosure involves operation range extension for versatile video coding.

BACKGROUND

The ubiquitous camera-enabled devices, such as smartphones, tablets, and computers, have made it easier than ever to capture videos or images. However, the amount of data for even a short video can be substantially large. Video coding technology (including video encoding and decoding) allows video data to be compressed into smaller sizes thereby allowing various videos to be stored and transmitted. Video coding has been used in a wide range of applications, such as digital TV broadcast, video transmission over the internet and mobile networks, real-time applications (e.g., video chat, video conferencing), DVD and Blu-ray discs, and so on. To reduce the storage space for storing a video and/or the network bandwidth consumption for transmitting a video, it is desired to improve the efficiency of the video coding scheme.

SUMMARY

Some embodiments involve history-based Rice parameter derivations for wavefront parallel processing in video coding. In one example, a method for decoding a video from a video bitstream encoded using Versatile Video Coding (VVC) comprises determining a bit depth of samples of the video based on Sequence Parameter Set (SPS) syntax element sps_bitdepth_minus8, wherein a value of the SPS syntax element sps_bitdepth_minus8 is in a range of 0 to 8; determining a size of a decoded picture buffer (DPB) based on a Video Parameter Set (VPS) syntax element vps_ols_dpb_bitdepth_minus8, wherein a value of the VPS syntax element vps_ols_dpb_bitdepth_minus8 is in a range of 0 to 8; allocating a storage space with the determined size of the DPB; obtaining and storing a decoded picture in the DPB by decoding the video bitstream based on the determined bit depth; and outputting the decoded picture.

In another example, a non-transitory computer-readable medium has program code that is stored thereon and is executable by one or more processing devices for performing operations. The operations comprises determining a size of a decoded picture buffer (DPB) for a video based on a Video Parameter Set (VPS) syntax element vps_ols_dpb_bitdepth_minus8 included in a video bitstream of the video, wherein the video bitstream is encoded using Versatile Video Coding (VVC) and a value of the VPS syntax element vps_ols_dpb_bitdepth_minus8 is in a range of 0 to 8; allocating a storage space with the determined size of the DPB; obtaining and storing a decoded picture in the DPB by decoding the video bitstream; and outputting the decoded picture.

In another example, a system comprises a processing device and a non-transitory computer-readable medium communicatively coupled to the processing device. The processing device is configured to execute program code stored in the non-transitory computer-readable medium and thereby perform operations comprising: determining a size of a decoded picture buffer (DPB) for a video based on a Video Parameter Set (VPS) syntax element vps_ols_dpb_bitdepth_minus8 included in a video bitstream of the video, wherein the video bitstream is encoded using Versatile Video Coding (VVC) and a value of the VPS syntax element vps_ols_dpb_bitdepth_minus8 is in a range of 0 to 8; allocating a storage space with the determined size of the DPB; obtaining and storing a decoded picture in the DPB by decoding the video bitstream; and outputting the decoded picture.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE DRAWINGS

Features, embodiments, and advantages of the present disclosure are better understood when the following Detailed Description is read with reference to the accompanying drawings.

DETAILED DESCRIPTION

Figure 1:
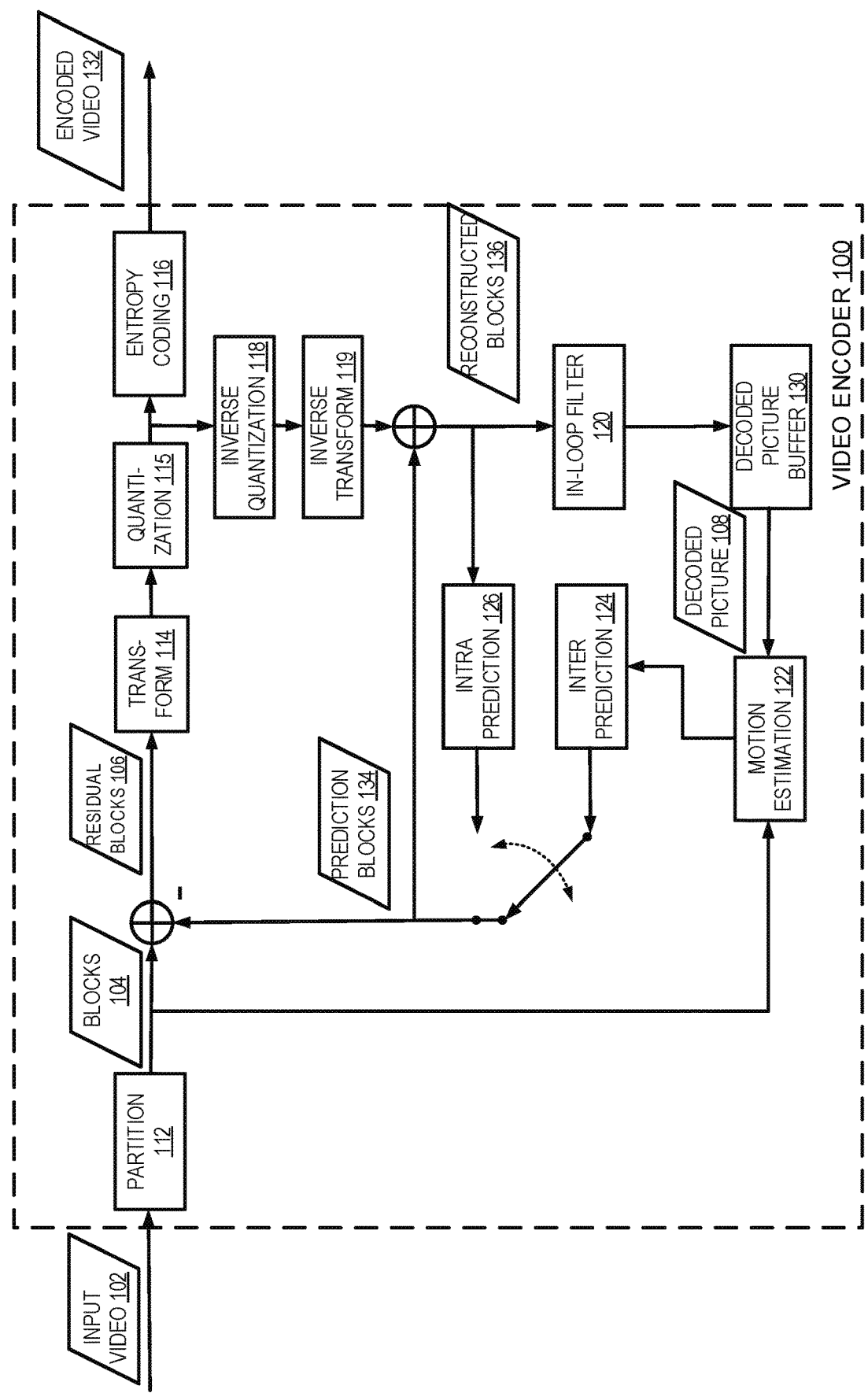
FIG. 1 is a block diagram showing an example of a video encoder configured to implement embodiments presented herein.

Various embodiments provide history-based Rice parameter derivations for wavefront parallel processing in video coding. As discussed above, more and more video data are being generated, stored, and transmitted. It is beneficial to increase the efficiency of the video coding technology thereby using less data to represent a video without compromising the visual quality of the decoded video. One way to improve the coding efficiency is through entropy coding to compress processed video samples into a binary bitstream using as few bits as possible. On the other hand, because video typically contains a large amount of data, it is beneficial to reduce the processing time during the coding (encoding and decoding). To do so, parallel processing can be employed in video encoding and decoding.

In entropy coding, video samples are binarized to binary bins and coding algorithms such as context-adaptive binary arithmetic coding (CABAC) can further compress bins into bits. The binarization requires the calculation of a binarization parameter, such as the Rice parameter used in a combination of truncated Rice (TR) and limited k-th order Exp-Golomb (EGk) binarization process as specified in the Versatile Video Coding (VVC) specification. To improve the coding efficiency, history-based Rice parameter derivation is used. In this history-based Rice parameter derivation, the Rice parameter for a transform unit (TU) in a current coding tree unit (CTU) of a partition (e.g., a picture, a slice, or a tile) is derived based on a history counter (denoted as StatCoeff) calculated according to coefficients in previous TUs in the current CTU and previous CTU(s) in the partition. The history counter is then used to derive a replacement variable (denoted as HistValue) to be used to derive the Rice parameter. The history counter may be updated when processing a TU. In some examples, the replacement variable remains the same for the TU even if the history counter is updated.

The dependency between the current CTU and previous CTU(s) in a partition for calculating the history counter may conflict, limit or even prevent the use of the parallel processing leading to unstable or inefficient video coding. Various embodiments described herein address these problems by reducing or eliminating the dependency between some CTUs in a partition so that parallel processing can be enabled to speed up the video processing process or by detecting and avoiding the conflict before it occurs. The following non-limiting examples are provided to introduce some embodiments.

In one embodiment, the dependency between the CTUs in different CTU rows when calculating the history counter is removed, thereby eliminating the dependency conflicts with the parallel processing. For example, the history counter can be re-initialized for each CTU row of a partition. Before the Rice parameter for the first CTU in a CTU row is calculated, the history counter can be set to an initial value. Subsequent history counter can be calculated based on the history counter value in previous TUs in the same CTU rows. In this way, the dependency of CTUs in history-based Rice parameter derivation is limited within the same CTU row and does not interfere with the parallel processing among different CTU rows while still benefiting from the coding gain achieved through history-based Rice parameter derivation. In addition, the history-based Rice parameter derivation process is simplified, and the computational complexity is reduced.

In another embodiment, the dependency between the CTUs when calculating the history counter is aligned with the dependency between CTUs in parallel processing. For instance, parallel coding may be implemented among CTU rows of a partition, and there can be an N-CTU delay between two consecutive CTU rows. That is, the processing of a CTU row starts after N CTUs in the previous CTU row have been processed. In this scenario, the history counter for a CTU row can be calculated based on samples in the first N or fewer CTUs in the previous CTU row. This can be implemented through a storage-synchronization process. After the last TU in the first CTU of a CTU row is processed, the history counter can be stored in a storage variable. Then before processing the first TU in the first CTU of the subsequent CTU row, the history counter can be synchronized with the stored value in the storage variable.

In some examples, an alternative history-based Rice parameter derivation is used. In this alternative history-based Rice parameter derivation, the replacement variable HistValue is updated once the history counter StatCoeff is updated when processing a TU. To avoid the dependency conflict with the parallel coding, the dependency between the CTUs when calculating the history counter can be similarly limited to be no more than N CTUs. Likewise, a storage-synchronization process can be implemented. After the last TU in the first CTU of a CTU row is processed, the history counter and the replacement variable can each be stored in a storage variable. Then before processing the first TU in the first CTU of the subsequent CTU row, the history counter and the replacement variable can be synchronized with the stored value in the respective storage variable.

In this way, the dependency between CTUs in two consecutive CTU rows when calculating the history counter is limited to be no more than (i.e., aligned with) the dependency between CTUs when performing the parallel coding. As a result, the history counter calculation does not interfere with the parallel processing while still benefiting from the coding gain achieved through history-based Rice parameter derivation.

Alternatively, the parallel processing and the history-based Rice parameter derivation is prevented to co-exist in a bitstream. For instance, a video coder can determine whether the parallel processing is enabled. If the parallel processing is enabled, history-based Rice parameter derivation is disabled; otherwise, the history-based Rice parameter derivation is enabled. Similarly, if a video coder determines that the history-based Rice parameter derivation is enabled, the parallel processing is disabled and vice versa.

Using the Rice parameter determined as discussed above, the video encoder can binarize the prediction residual data (e.g., the quantized transform coefficients of residuals) into binary bins and use entropy coding algorithms to further compress bins into bits to be included in video bitstreams. At the decoder side, the decoder can decode the bitstream back to binary bins and determine the Rice parameter using any method or any combination of methods described above and subsequently determine the coefficients from the binary bins. The coefficients can be further de-quantized and inverse transformed to reconstruct the video blocks for display.

In some embodiments, the bit depth of samples of the video (e.g., the bit depth used to determine the initial value of the history counter StatCoeff) can be determined according to a Sequence Parameter Set (SPS) syntax element sps_bitdepth_minus8. The value of the SPS syntax element sps_bitdepth_minus8 is in a range of 0 to 8. Similarly, the size of a decoded picture buffer (DPB) used to store decoded pictures can be determined based on a Video Parameter Set (VPS) syntax element vps_ols_dpb_bitdepth_minus8. The value of the VPS syntax element vps_ols_dpb_bitdepth_minus8 is in a range of 0 to 8. According to the determined size of the DPB, storage space can be allocated for the DPB. The determined bit depth and the DPB can be used throughout the decoding of the video bitstream into pictures.

As described herein, some embodiments provide improvements in video coding efficiency and computational efficiency by coordinating the history-based Rice parameter derivation with the parallel coding. By doing so, conflicts can be avoided between the history-based Rice parameter derivation and the parallel coding thereby improving the stability of the coding process. Further, by limiting the dependency between CTUs in the history-based Rice parameter derivation to be no more than the dependency in the parallel coding, the coding gain can still be achieved through history-based Rice parameter derivation without sacrificing the computational efficiency of the coding process. The techniques can be an effective coding tool in future video coding standards.

Referring now to the drawings, FIG. 1 is a block diagram showing an example of a video encoder 100 configured to implement embodiments presented herein. In the example shown in FIG. 1, the video encoder 100 includes a partition module 112, a transform module 114, a quantization module 115, an inverse quantization module 118, an inverse transform module 119, an in-loop filter module 120, an intra prediction module 126, an inter prediction module 124, a motion estimation module 122, a decoded picture buffer 130, and an entropy coding module 116.

The input to the video encoder 100 is an input video 102 containing a sequence of pictures (also referred to as frames or images). In a block-based video encoder, for each of the pictures, the video encoder 100 employs a partition module 112 to partition the picture into blocks 104, and each block contains multiple pixels. The blocks may be macroblocks, coding tree units, coding units, prediction units, and/or prediction blocks. One picture may include blocks of different sizes and the block partitions of different pictures of the video may also differ. Each block may be encoded using different predictions, such as intra prediction or inter prediction or intra and inter hybrid prediction.

Usually, the first picture of a video signal is an intra-predicted picture, which is encoded using only intra prediction. In the intra prediction mode, a block of a picture is predicted using only data from the same picture. A picture that is intra-predicted can be decoded without information from other pictures. To perform the intra-prediction, the video encoder 100 shown in FIG. 1 can employ the intra prediction module 126. The intra prediction module 126 is configured to use reconstructed samples in reconstructed blocks 136 of neighboring blocks of the same picture to generate an intra-prediction block (the prediction block 134). The intra prediction is performed according to an intra-prediction mode selected for the block. The video encoder 100 then calculates the difference between block 104 and the intra-prediction block 134. This difference is referred to as residual block 106.

To further remove the redundancy from the block, the residual block 106 is transformed by the transform module 114 into a transform domain by applying a transform to the samples in the block. Examples of the transform may include, but are not limited to, a discrete cosine transform (DCT) or discrete sine transform (DST). The transformed values may be referred to as transform coefficients representing the residual block in the transform domain. In some examples, the residual block may be quantized directly without being transformed by the transform module 114. This is referred to as a transform skip mode.

The video encoder 100 can further use the quantization module 115 to quantize the transform coefficients to obtain quantized coefficients. Quantization includes dividing a sample by a quantization step size followed by subsequent rounding, whereas inverse quantization involves multiplying the quantized value by the quantization step size. Such a quantization process is referred to as scalar quantization. Quantization is used to reduce the dynamic range of video samples (transformed or non-transformed) so that fewer bits are used to represent the video samples.

The quantization of coefficients/samples within a block can be done independently and this kind of quantization method is used in some existing video compression standards, such as H.264, and HEVC. For an N-by-M block, a specific scan order may be used to convert the 2D coefficients of a block into a 1-D array for coefficient quantization and coding. Quantization of a coefficient within a block may make use of the scan order information. For example, the quantization of a given coefficient in the block may depend on the status of the previous quantized value along the scan order. In order to further improve the coding efficiency, more than one quantizer may be used. Which quantizer is used for quantizing a current coefficient depends on the information preceding the current coefficient in encoding/decoding scan order. Such a quantization approach is referred to as dependent quantization.

The degree of quantization may be adjusted using the quantization step sizes. For instance, for scalar quantization, different quantization step sizes may be applied to achieve finer or coarser quantization. Smaller quantization step sizes correspond to finer quantization, whereas larger quantization step sizes correspond to coarser quantization. The quantization step size can be indicated by a quantization parameter (QP). The quantization parameters are provided in the encoded bitstream of the video such that the video decoder can apply the same quantization parameters for decoding.

The quantized samples are then coded by the entropy coding module 116 to further reduce the size of the video signal. The entropy encoding module 116 is configured to apply an entropy encoding algorithm to the quantized samples. In some examples, the quantized samples are binarized into binary bins and coding algorithms further compress the binary bins into bits. Examples of the binarization methods include, but are not limited to, truncated Rice (TR) and limited k-th order Exp-Golomb (EGk) binarization. To improve the coding efficiency, a method of history-based Rice parameter derivation is used, where the Rice parameter derived for a transform unit (TU) is based on a variable obtained or updated from previous TUs. Examples of the entropy encoding algorithm include, but are not limited to, a variable length coding (VLC) scheme, a context adaptive VLC scheme (CAVLC), an arithmetic coding scheme, a binarization, a context-adaptive binary arithmetic coding (CABAC), syntax-based context-adaptive binary arithmetic coding (SBAC), probability interval partitioning entropy (PIPE) coding, or other entropy encoding techniques. The entropy-coded data is added to the bitstream of the output encoded video 132.

As discussed above, reconstructed blocks 136 from neighboring blocks are used in the intra-prediction of blocks of a picture. Generating the reconstructed block 136 of a block involves calculating the reconstructed residuals of this block. The reconstructed residual can be determined by applying inverse quantization and inverse transform to the quantized residual of the block. The inverse quantization module 118 is configured to apply the inverse quantization to the quantized samples to obtain de-quantized coefficients. The inverse quantization module 118 applies the inverse of the quantization scheme applied by the quantization module 115 by using the same quantization step size as the quantization module 115. The inverse transform module 119 is configured to apply the inverse transform of the transform applied by the transform module 114 to the de-quantized samples, such as inverse DCT or inverse DST. The output of the inverse transform module 119 is the reconstructed residuals for the block in the pixel domain. The reconstructed residuals can be added to the prediction block 134 of the block to obtain a reconstructed block 136 in the pixel domain. For blocks where the transform is skipped, the inverse transform module 119 is not applied to those blocks. The de-quantized samples are the reconstructed residuals for the blocks.

Blocks in subsequent pictures following the first intra-predicted picture can be coded using either inter prediction or intra prediction. In inter-prediction, the prediction of a block in a picture is from one or more previously encoded video pictures. To perform inter prediction, the video encoder 100 uses an inter prediction module 124. The inter prediction module 124 is configured to perform motion compensation for a block based on the motion estimation provided by the motion estimation module 122.

The motion estimation module 122 compares a current block 104 of the current picture with decoded reference pictures 108 for motion estimation. The decoded reference pictures 108 are stored in a decoded picture buffer 130. The motion estimation module 122 selects a reference block from the decoded reference pictures 108 that best matches the current block. The motion estimation module 122 further identifies an offset between the position (e.g., x, y coordinates) of the reference block and the position of the current block. This offset is referred to as the motion vector (MV) and is provided to the inter prediction module 124. In some cases, multiple reference blocks are identified for the block in multiple decoded reference pictures 108. Therefore, multiple motion vectors are generated and provided to the inter prediction module 124.

The inter prediction module 124 uses the motion vector(s) along with other inter-prediction parameters to perform motion compensation to generate a prediction of the current block, i.e., the inter prediction block 134. For example, based on the motion vector(s), the inter prediction module 124 can locate the prediction block(s) pointed to by the motion vector(s) in the corresponding reference picture(s). If there are more than one prediction block, these prediction blocks are combined with some weights to generate a prediction block 134 for the current block.

For inter-predicted blocks, the video encoder 100 can subtract the inter-prediction block 134 from the block 104 to generate the residual block 106. The residual block 106 can be transformed, quantized, and entropy coded in the same way as the residuals of an intra-predicted block discussed above. Likewise, the reconstructed block 136 of an inter-predicted block can be obtained through inverse quantizing, inverse transforming the residual, and subsequently combining with the corresponding prediction block 134.

To obtain the decoded picture 108 used for motion estimation, the reconstructed block 136 is processed by an in-loop filter module 120. The in-loop filter module 120 is configured to smooth out pixel transitions thereby improving the video quality. The in-loop filter module 120 may be configured to implement one or more in-loop filters, such as a de-blocking filter, or a sample-adaptive offset (SAO) filter, or an adaptive loop filter (ALF), etc.

Figure 2:
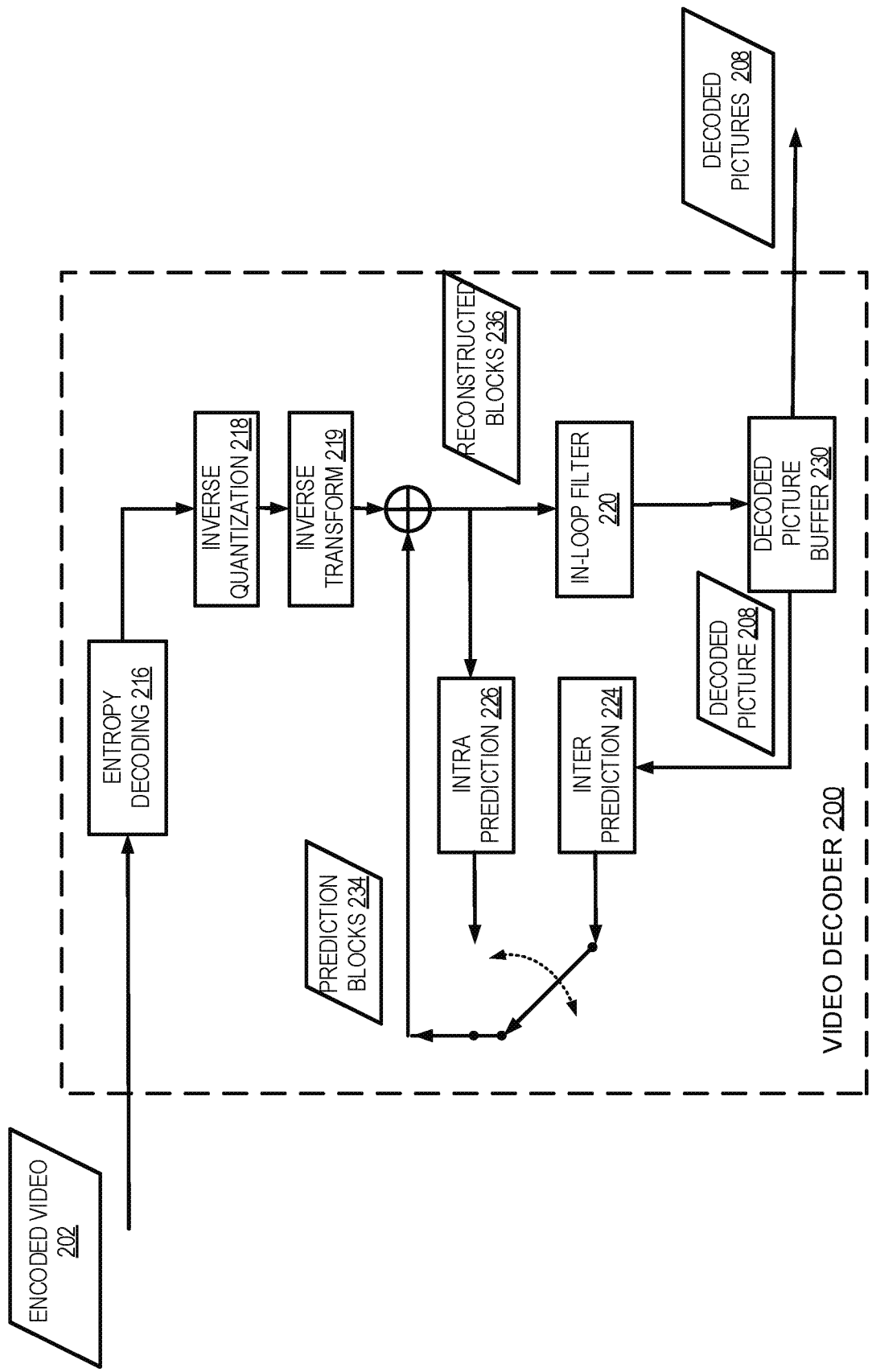
FIG. 2 is a block diagram showing an example of a video decoder configured to implement embodiments presented herein.

FIG. 2 depicts an example of a video decoder 200 configured to implement embodiments presented herein. The video decoder 200 processes an encoded video 202 in a bitstream and generates decoded pictures 208. In the example shown in FIG. 2, the video decoder 200 includes an entropy decoding module 216, an inverse quantization module 218, an inverse transform module 219, an in-loop filter module 220, an intra prediction module 226, an inter prediction module 224, and a decoded picture buffer 230.

The entropy decoding module 216 is configured to perform entropy decoding of the encoded video 202. The entropy decoding module 216 decodes the quantized coefficients, coding parameters including intra prediction parameters and inter prediction parameters, and other information. In some examples, the entropy decoding module 216 decodes the bitstream of the encoded video 202 to binary representations and then converts the binary representations to the quantization levels for the coefficients. The entropy-decoded coefficients are then inverse quantized by the inverse quantization module 218 and subsequently inverse transformed by the inverse transform module 219 to the pixel domain. The inverse quantization module 218 and the inverse transform module 219 function similarly to the inverse quantization module 118 and the inverse transform module 119, respectively, as described above with respect to FIG. 1. The inverse-transformed residual block can be added to the corresponding prediction block 234 to generate a reconstructed block 236. For blocks where the transform is skipped, the inverse transform module 219 is not applied to those blocks. The de-quantized samples generated by the inverse quantization module 118 are used to generate the reconstructed block 236.

The prediction block 234 of a particular block is generated based on the prediction mode of the block. If the coding parameters of the block indicate that the block is intra predicted, the reconstructed block 236 of a reference block in the same picture can be fed into the intra prediction module 226 to generate the prediction block 234 for the block. If the coding parameters of the block indicate that the block is inter-predicted, the prediction block 234 is generated by the inter prediction module 224. The intra prediction module 226 and the inter prediction module 224 function similarly to the intra prediction module 126 and the inter prediction module 124 of FIG. 1, respectively.

As discussed above with respect to FIG. 1, the inter prediction involves one or more reference pictures. The video decoder 200 generates the decoded pictures 208 for the reference pictures by applying the in-loop filter module 220 to the reconstructed blocks of the reference pictures. The decoded pictures 208 are stored in the decoded picture buffer 230 for use by the inter prediction module 224 and also for output.

Figure 3:
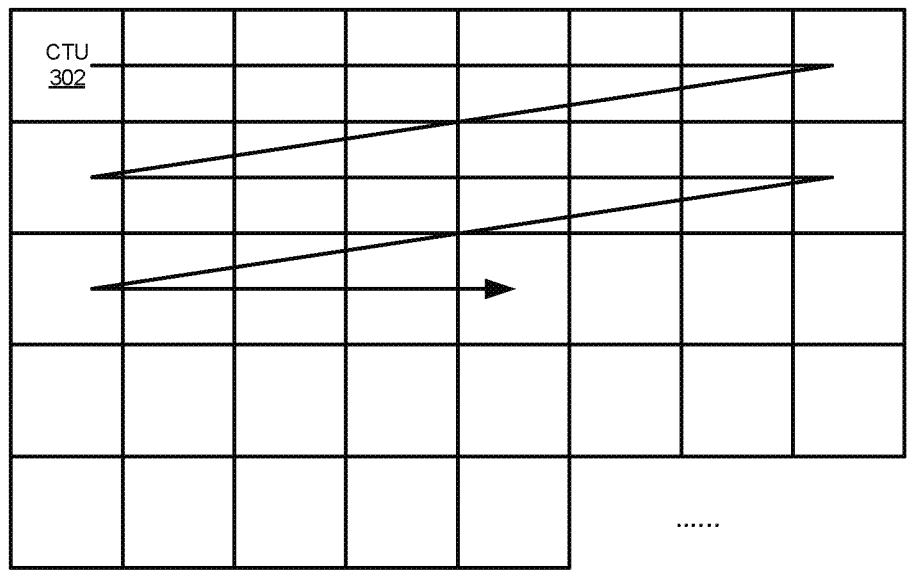
FIG. 3 depicts an example of a coding tree unit division of a picture in a video, according to some embodiments of the present disclosure.
Figure 4:
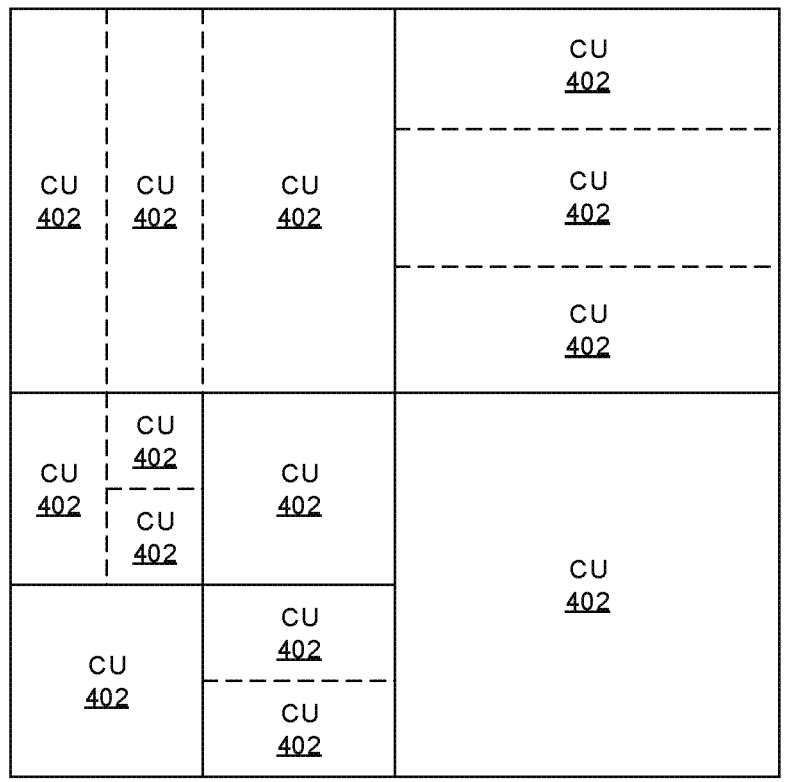
FIG. 4 depicts an example of a coding unit division of a coding tree unit, according to some embodiments of the present disclosure.

Referring now to FIG. 3, FIG. 3 depicts an example of a coding tree unit division of a picture in a video, according to some embodiments of the present disclosure. As discussed above with respect to FIGS. 1 and 2, to encode a picture of a video, the picture is divided into blocks, such as the CTUs (Coding Tree Units) 302 in VVC, as shown in FIG. 3. For example, the CTUs 302 can be blocks of 128×128 pixels. The CTUs are processed according to an order, such as the order shown in FIG. 3. In some examples, each CTU 302 in a picture can be partitioned into one or more CUs (Coding Units) 402 as shown in FIG. 4, which can be further partitioned into prediction units or transform units (TUs) for prediction and transformation. Depending on the coding schemes, a CTU 302 may be partitioned into CUs 402 differently. For example, in VVC, the CUs 402 can be rectangular or square, and can be coded without further partitioning into prediction units or transform units. Each CU 402 can be as large as its root CTU 302 or be subdivisions of a root CTU 302 as small as 4×4 blocks. As shown in FIG. 4, a division of a CTU 302 into CUs 402 in VVC can be quadtree splitting or binary tree splitting or ternary tree splitting. In FIG. 4, solid lines indicate quadtree splitting and dashed lines indicate binary or ternary tree splitting.

As discussed above with respect to FIGS. 1 and 2, quantization is used to reduce the dynamic range of elements of blocks in the video signal so that fewer bits are used to represent the video signal. In some examples, before quantization, an element at a specific position of the block is referred to as a coefficient. After quantization, the quantized value of the coefficient is referred to as a quantization level or a level. Quantization typically consists of division by a quantization step size and subsequent rounding while inverse quantization consists of multiplication by the quantization step size. Such a quantization process is also referred to as scalar quantization. The quantization of the coefficients within a block can be performed independently and this kind of independent quantization method is used in some existing video compression standards, such as H.264, HEVC, etc. In other examples, dependent quantization is employed, such as in VVC.

Figure 5:
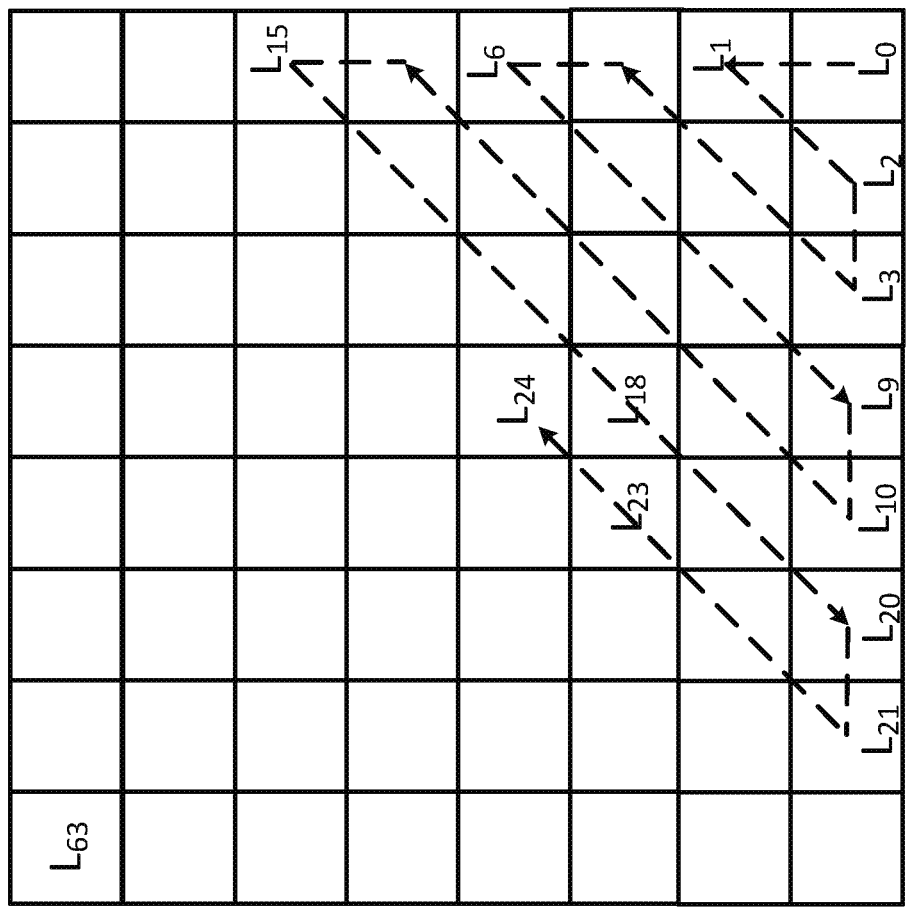
FIG. 5 depicts an example of a coding block with a pre-determined order for processing the elements of the coding block.

For an N-by-M block, a specific scanning order may be used to convert 2-D coefficients of a block into a 1-D array for coefficient quantization and coding, and the same scanning order is used for both encoding and decoding. FIG. 5 shows an example of a coding block (such as a transform unit (TU)) with a pre-determined scanning order for processing the coefficients of the coding block. In this example, the coding block 500 has a size of 8×8 and the processing starts at the lower right corner at position $L_0$ and ends at the upper left corner $L_{63}$. If block 500 is a transformed block, the pre-determined order shown in FIG. 5 starts from the highest frequency to the lowest frequency. In some examples, the processing of the block, such as quantization and binarization, starts from the first non-zero element of the block according to the pre-determined scanning order. For instance, if the coefficients at locations $L_0$-$L_{17}$ are all zero and the coefficient at $L_{18}$ is non-zero, then the processing starts at the coefficient at $L_{18}$ and is performed for each coefficient after $L_{18}$ in the scanning order.

Residual Coding

Residual coding is used to convert the quantization levels into a bit stream in video coding. After quantization, there are N×M quantization levels for an N×M transform unit (TU) coding block. These N×M levels may be zero or non-zero values. The non-zero levels will further be binarized to binary bins if the levels are not binary. Context-adaptive binary arithmetic coding (CABAC) can further compress bins into bits. Furthermore, there are two kinds of context modeling-based coding methods. In particular, one of the methods updates the context model adaptively according to the neighboring coded information. Such method is called context coded method, and bins coded in this way are called as context coded bins. In contrast, the other method assumes the probability of 1 or 0 is always 50% and therefore always uses a fixed context modeling without adaptation. This kind of method is called as bypass method and bins coded by this method are called as bypass bins.

For a regular residual coding (RRC) block in VVC, the position of the last non-zero level is defined as the position of last non-zero level along the coding scanning order. The representation of the 2D coordinates (last_sig_coeff_x and last_sig_coeff_y) of the last non-zero level includes a total of 4 prefix and suffix syntax elements, which are last_sig_coeff_x_prefix, last_sig_coeff_y_prefix, last_sig_coeff_x_suffix, last_sig_coeff_y_suffix. The syntax elements last_sig_coeff_x_prefix and last_sig_coeff_y_prefix are first coded with context coded method. If last_sig_coeff_x_suffix and last_sig_coeff_y_suffix are presented, they are coded with the bypass method. A RRC block may consist of several pre-defined sub-blocks. The syntax element sb_coded_flag is used to indicate if the current sub-block has all the levels equal to zero or not. If sb_coded_flag is equal to 1, there is at least one non-zero coefficient in the current sub-block. If sb_coded_flag is equal to 0, all coefficients in the current sub-block will be zeros. However, the sb_coded_flag for the last non-zero sub-block which has the last non-zero level is derived as 1 from last_sig_coeff_x and last_sig_coeff_y according to the coding scanning order without coding into bitstream. Moreover, the sb_coded_flag for the top-left sub-block which contains the DC position is also derived as 1 without coding into bitstream. The syntax elements of sb_coded_flag in the bitstream are coded through the context coded method. RRC will code sub-block by sub-block starting from the last non-zero sub-block with a reverse coding scanning order as discussed above with respect to FIG. 5.

In order to guarantee the worst-case throughput, a pre-defined value remBinsPass1 is used to limit the maximum number of context coded bins. Within a sub-block, RRC will code the level of each position with a reverse coding scan order. If remBinsPass1 is greater than 4, when coding the current level, a flag, named as sig_coeff_flag, is first coded into the bitstream to indicate if the level is zero or non-zero. If the level is non-zero, the abs_level_gtx_flag[n][0] where n is the index along the scanning order of the current position within a sub-block to indicate if the absolute level is 1 or greater than 1. If the absolute level is greater than 1, the par_level_flag will be coded to indicate if the level is an odd or even number in VVC and then abs_level_gtx_flag[n][1] will be present. The flags of par_level_flag and abs_level_gtx_flag[n][1] are also used together to indicate the level is 2, or 3 or greater than 3. After coding each of the above syntax elements as a context-coded bin, the value of remBinsPass1 will be decreased by one.

If the absolute level is greater than 3 or the value of remBinsPass1 is not greater than 4, two more syntax elements, abs_remainder and dec_abs_level may be coded as bypass-coded bins for the remaining level after coding the aforementioned bins by the context coded method. In addition, the sign of each level within a block will also be coded to represent the quantization level, and they are coded as bypass-coded bins.

Another residual coding method uses abs_level_gtxX_flag and the remaining level to allow conditionally parsing of the syntax elements for level coding of a residual block, and the corresponding binarization of the absolute value of level is shown in Table 1. Here abs_level_gtxX_flag describes if the absolute value of the level is greater than X where X is an integer number, e.g., 0, 1, 2, or N. If abs_level_gtxY_flag is 0 where Y is an integer between 0 and N−1, abs_level_gtx(Y+1) flag will not be present. If abs_level_gtxY_flag is 1, abs_level_gtx(Y+1) flag will be present. Moreover, if abs_level_gtxN_flag is 0, the remaining level will not be present. When abs_level_gtxN_flag is 1, the remaining level will be present and it represents the value after removing (N+1) from the level. Typically, abs_level_gtxX_flag is coded with context coded method and remaining level is coded with bypass method, respectively.

TABLE 1

The residual coding based upon abs_level_gtxX_flag and remainder

| abs(level) | 0 | 1 | 2 | 3 | 4 | 5 | 6 | 7 | 8 | 9 | 10 | 11 | 12 | ... |
|---|---|---|---|---|---|---|---|---|---|---|---|---|---|---|
| abs_level_gtx0_flag | 0 | 1 | 1 | 1 | 1 | 1 | 1 | 1 | 1 | 1 | 1 | 1 | 1 | ... |
| abs_level_gtx1_flag |   | 0 | 1 | 1 | 1 | 1 | 1 | 1 | 1 | 1 | 1 | 1 | 1 | ... |
| abs_level_gtx2_flag |   |   | 0 | 1 | 1 | 1 | 1 | 1 | 1 | 1 | 1 | 1 | 1 | ... |
| abs_level_gtx3_flag |   |   |   | 0 | 1 | 1 | 1 | 1 | 1 | 1 | 1 | 1 | 1 | ... |
| remainder |   |   |   |   | 0 | 1 | 2 | 3 | 4 | 5 | 6 | 7 | 8 | ... |

For a block coded in the transform skip residual coding mode (TSRC), TSRC will code sub-block by sub-block starting from the top-left sub-block along the coding scan order. Similarly, the syntax element sb_coded_flag is used to indicate if the current sub-block has all the residuals equal to zero or not. All the syntax elements of sb_coded_flag for all sub_blocks are coded into the bitstream except for the last sub-block when a certain condition occurs. If all the sb_coded_flags are not equal to 1 for all the sub-blocks before the last sub-block, sb_coded_flag will be derived as 1 for the last sub-block and this flag is not coded into the bitstream. In order to guarantee the worst-case throughput, a pre-defined value RemCcbs is used to limit the maximum context coded bins. If the current sub-block has non-zero levels, TSRC will code the level of each position with the coding scan order. If RemCcbs is greater than 4, the following syntax elements will be coded with context coded method. For each level, sig_coeff_flag, is first coded into the bitstream to indicate if the level is zero or non-zero. If the level is non-zero, coeff_sign_flag will be coded to indicate the level is positive or negative. Then abs_level_gtx_flag[n][0] where n is the index along scan order of current position within a sub-block will be coded to indicate if the current absolute level of current position is greater than 1 or not. If abs_level_gtx_flag[n][0] is not zero, par_level_flag will be coded. After coding each above syntax element with context coded method, the value of RemCcbs will be decreased by one.

After coding above syntax elements for all the positions within the current sub-block, if the RemCcbs is still greater than 4, up to four more abs_level_gtx_flag[n][j] where n is the index along the scanning order of current position within a sub-block; j is from 1 to 4 and will be coded with context coded method. The value of RemCcbs will be decreased by one after each abs_level_gtx_flag[n][j] is coded. If RemCcbs is not greater than 4, syntax element abs_remainder will be coded with the bypass method, if necessary, for the current position within a sub-block. For those positions where the absolute levels are fully coded with abs_remainder syntax element through the bypass method, the coeff_sign_flags are also coded by the bypass method. In summary, there is a pre-defined counter remBinsPass1 in RRC or RemCcbs in TSRC to limit the total number of context coded bins and to assure the worst-case throughput.

Rice Parameter Derivation

In the current RRC design in VVC, two syntax elements, abs_remainder and dec_abs_level coded as bypass bins, may be present in the bitstream for the remaining levels. Both abs_remainder and dec_abs_level are binarized through a combination of truncated Rice (TR) and limited k-th order Exp-Golomb (EGk) binarization process as specified in the VVC specification, which requires a Rice parameter to binarize a given level. In order to have an optimal Rice parameter, a local sum method is employed as described in the following.

The array AbsLevel[xC][yC] represents an array of absolute values of transform coefficient levels for the current transform block for color component index cIdx. Given the array AbsLevel[x][y] for the transform block with color component index cIdx and the top-left luma location (x0, y0), a local sum variable locSumAbs is derived as specified by the following pseudo-code process:

```
locSumAbs = 0
if( xC < ( 1 << log2TbWidth ) - 1 ) {
    locSumAbs += AbsLevel[ xC + 1 ][ yC ]
    if( xC < ( 1 << log2TbWidth ) -2 )
        locSumAbs += AbsLevel[ xC + 2 ][ yC ]
    if( yC < ( 1 << log2TbHeight ) - 1 )
        locSumAbs += AbsLevel[ xC + 1 ][ yC + 1 ]
}
if( yC < ( 1 << log2TbHeight ) - 1 ) {
    locSumAbs += AbsLevel[ xC ][ yC + 1 ]
    if( yC < ( 1 << log2TbHeight ) -2 )
        locSumAbs += AbsLevel[ xC ][ yC + 2 ]
}
locSumAbs = Clip3( 0, 31, locSumAbs - baseLevel * 5 )
``` where log 2 TbWidth and log 2 TbHeight are base-2 logarithm of width and height of transform block, respectively. The variable baseLevel is 4 and 0 for abs_remainder and dec_abs_level, respectively. Given the local sum variable locSumAbs, the Rice parameter cRiceParam is derived as specified in Table 2.

TABLE 2

Specification of cRiceParam based on locSumAbs

| locSumAbs | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| cRiceParam | 0 | 0 | 0 | 0 | 0 | 0 | 0 | 1 | 1 | 1 | 1 | 1 | 1 | 1 | 2 | 2 |
| locSumAbs | 16 | 17 | 18 | 19 | 20 | 21 | 22 | 23 | 24 | 25 | 26 | 27 | 28 | 29 | 30 | 31 |
| cRiceParam | 2 | 2 | 2 | 2 | 2 | 2 | 2 | 2 | 2 | 2 | 2 | 2 | 3 | 3 | 3 | 3 |

History Based Rice Parameter Derivation

Figure 6:
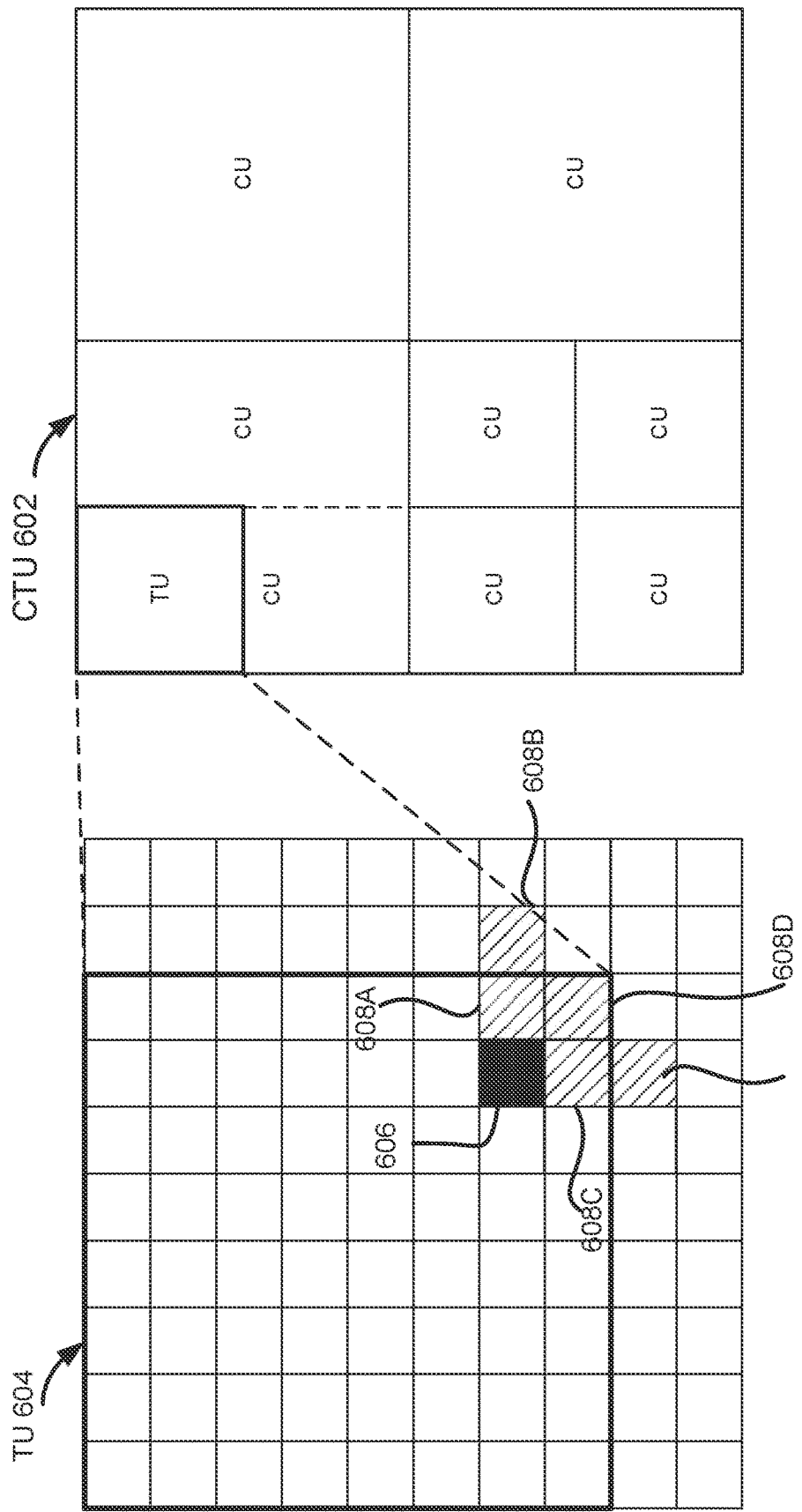
FIG. 6 depicts an example of a template pattern for calculating a local sum variable for a coefficient located near a transform unit boundary.

Template computation employed for the Rice parameter derivation may produce inaccurate estimates of coefficients, if the coefficients are located at the TU boundary, or being first decoded with the Rice method. For those coefficients, the template computation is biased toward 0 because some template positions may be located outside of the TU and interpreted as or initialized to be value 0. FIG. 6 shows an example of a template pattern for calculating the locSumAbs for a coefficient located near the TU boundary. FIG. 6 shows a CTU 602 divided into multiple CUs and each CU includes multiple TUs. For TU 604, the position of the current coefficient is shown in a solid block and positions of its neighboring samples in the template pattern are shown in patterned blocks. The patterned blocks indicate the predetermined neighborhood of the current coefficient that is used to calculate the local sum variable locSumAbs.

In FIG. 6, because the current coefficient 606 is close to the boundary of TU 604, some of its neighboring samples in the template pattern are outside the TU boundary, such as neighboring samples 608B and 608E. In the Rice parameter derivation described above, these out-of-boundary neighboring samples are set to 0 when calculating the local sum variable locSumAbs, leading to an inaccuracy in the Rice parameter derivation. For high bit depth samples (e.g., more than 10 bits), the neighboring samples outside the TU boundary can be large numbers. Setting these large numbers to 0 will introduce more errors in the Rice parameter derivation.

To improve the accuracy of Rice estimate from the computed template, it was proposed that for template positions outside the current TU, the local sum variable locSumAbs is updated with a history derived value, instead of 0 initialization. Implementation of this method is shown below by the VVC specification text extract for clause 9.3.3.2, with proposed text being underlined.

To maintain a history of the neighboring coefficient/sample values, a history counter per color component StatCoeff[cIdx] is utilized with cIdx=0, 1, 2 representing three color components Y, U, V, respectively. If the CTU is the first CTU in a partition (e.g., a picture, a slice, or a tile), the StatCoeff[cIdx] is initialized as follows:

$$\text{StatCoeff}[idx]=2*\text{Floor}(\text{Log 2}(\text{BitDepth}-10)). \quad (1)$$

Here, BitDepth specifies the bit depth of the samples of the luma and chroma arrays of a video; Floor(x) represents the largest integer smaller than or equal to x and Log 2(x) is base-2 logarithm of x. Prior to the TU decoding and history counter update, a replacement variable HistValue is being initialized as:

$$\text{HistValue}[cIdx]=1<<\text{StatCoeff}[cIdx]. \quad (2)$$

The replacement variable HistValue is used as an estimate of the neighboring sample that is outside the TU boundary (e.g., the neighboring sample has a horizontal coordinate or a vertical coordinate outside the TU). The local sum variable locSumAbs is re-derived as specified by the following pseudo-code process with the changes underlined:

```
locSumAbs = 0
if( xC < ( 1 << log2TbWidth ) - 1 ) {
  locSumAbs += AbsLevel[ xC + 1 ][ yC ]
  if( xC < ( 1 << log2TbWidth ) - 2 )
    locSumAbs += AbsLevel[ xC + 2 ][ yC ]
  else
    locSumAbs += HistValue
  if( yC < ( 1 << log2TbHeight ) - 1 )
```

-continued

```
    locSumAbs += AbsLevel[ xC + 1 ][ yC + 1 ]
  else
    locSumAbs += Hist Value
}
else
  locSumAbs += 2 * HistValue
if( yC < ( 1 << log2TbHeight ) - 1 ) {
  locSumAbs += AbsLevel[ xC ][ yC + 1 ]
  if( yC < ( 1 << log2TbHeight ) -2 )
    locSumAbs += AbsLevel[ xC ][ yC + 2 ]
  else
    locSumAbs += Hist Value
}
else
  locSumAbs += HistValue
```

The history counter StatCoeff is updated once per TU from the first, non-zero, Golomb-Rice coded transform coefficient (abs_remainder[cIdx] or dec_abs_level[cIdx]) through a process of an exponential moving average. When the first, non-zero, Golomb-Rice coded transform coefficient in the TU is coded as abs_remainder, the history counter StatCoeff for color component cIdx is updated as the following:

$$\text{StatCoeff}[cIdx]=(\text{StatCoeff}[cIdx]+\text{Floor}(\text{Log 2}(abs\_remainder[cIdx]))+2)>>1 \quad (3)$$

When the first, non-zero, Golomb-Rice coded transform coefficient in the TU is coded as dec_abs_level, the history counter StatCoeff for color component cIdx is updated as the following:

$$\text{StatCoeff}[cIdx]=(\text{StatCoeff}[cIdx]+\text{Floor}(\text{Log 2}(dec\_abs\_level[cIdx])))>>1 \quad (4)$$

The updated StatCoeff can be used to calculate the replacement variable HistValue for the next TU according to Eqn. (2) prior to decoding the next TU.

Wavefront Parallel Processing (WPP)

Figure 7:
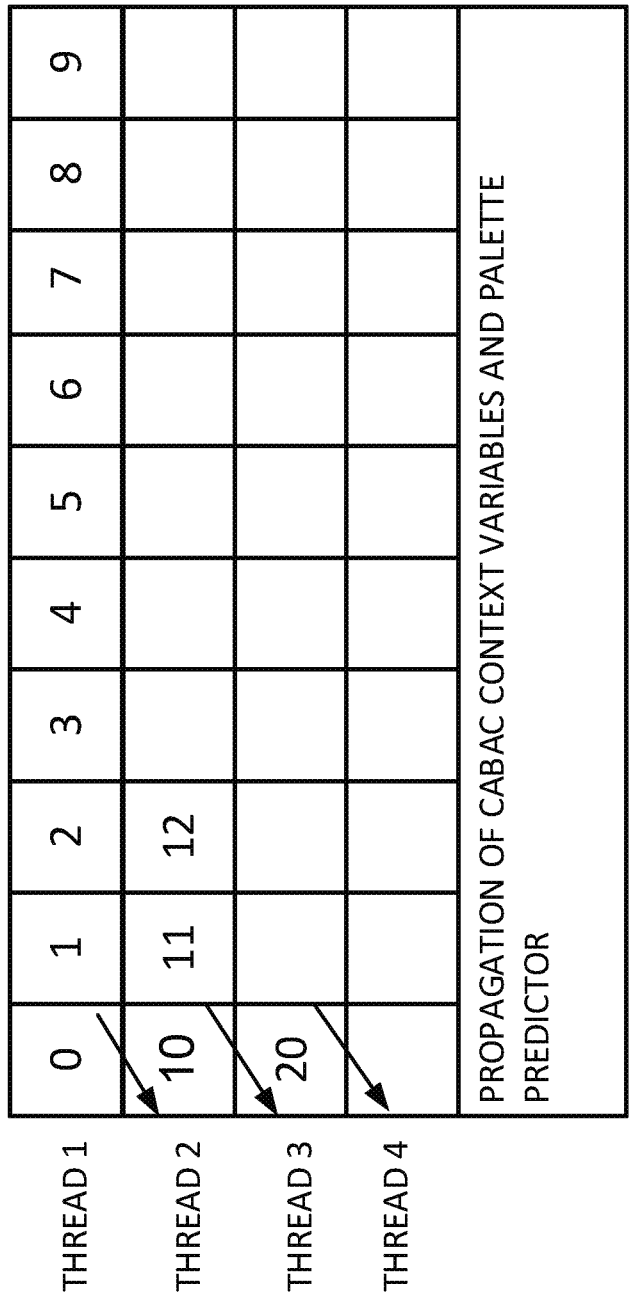
FIG. 7 depicts an example of a tile for which the wavefront parallel processing is enabled.

WPP is designed to provide a parallel coding mechanism. When WPP is enabled in VVC, each CTU row of a frame, or a tile, or a slice constitutes a separation partition. WPP is enabled/disabled by a SPS element sps_entropy_coding_sync_enabled_flag. FIG. 7 shows an example of a tile for which the WPP is enabled. In FIG. 7, each CTU row of the tile is processed relative to its preceding CTU row with a delay of one CTU. In this way, no dependencies between consecutive CTU rows are broken at the partition boundaries except for the CABAC context variables and palette predictor if palette coding is enabled at the end of each CTU row. To mitigate the potential loss in coding efficiency, the content of the adapted CABAC context variables and palette predictor are propagated from the first coded CTU of the preceding CTU row to the first CTU of the current CTU row. WPP does not change the regular raster scan order of CTUs.

When WPP is enabled, a number of threads up to the number of CTU rows in a partition (e.g., a tile, a slice, or a frame) can work in parallel to process the individual CTU rows. By using WPP in a decoder, each decoding thread processes a single CTU row of the partition. The scheduling of the thread processing must be organized so that for each CTU the decoding of its top neighboring CTU in the preceding CTU row must have been finished. Additional small overhead for WPP is added so that it can store the content of all CABAC context variables and palette predictor after having finished coding of the first CTU in each CTU row except the last CTU row.

When history-based Rice parameter derivation discussed above is enabled for high bit depth and high bit rate video coding, the last StatCoeff in the preceding CTU row will be passed to the first TU in the current CTU row. As a result, this process will interfere the WPP and break the parallelism of WPP when WPP is enabled at the same time. In this disclosure, several solutions are proposed to resolve this issue when parallel coding (e.g., WPP) is enabled.

In one embodiment, the dependency between the CTUs in different CTU rows when calculating the history counter StatCoeff is removed thereby eliminating the interference of the history-based Rice parameter derivation to the parallel coding. In this embodiment, rather than using the history counter StatCoeff value obtained from the previous CTU row, the initial value for StatCoeff[cIdx] is used for coding the first abs_remainder[cIdx] or dec_abs_level[cIdx] in each CTU row of a partition (e.g., a frame, or a tile, or a slice), where cIdx is the index for the color component.

As an example, the initial value of StatCoeff[cIdx] can be determined as follows:

$$\text{StatCoeff}[idx]=2*\text{Floor}(\text{Log }2(\text{BitDepth}-10)). \quad (5)$$

Here, BitDepth specifies the bit depth of the samples of the luma or chroma arrays, and Floor(x) represents the largest integer less than or equal to x. As another example, the initial value of StatCoeff[cIdx] can be determined as:

$$\text{StatCoeff}[idx]=\text{Clip}(\text{MIN\_Stat},\text{MAX\_Stat},(int)((19-QP)/6))-1. \quad (6)$$

Here, MIN_Stat, MAX_Stat are two predefined integers; QP is the initial QP for each slice and Clip( ) is an operation defined as follows:

$$\text{Clip}(x, y, z) = \begin{cases} x; & z < x \\ y; & z > y \\ z; & \text{otherwise} \end{cases} \quad (7)$$

Prior to coding the first TU of each CTU row of a partition (e.g., a frame, a tile, or a slice), the replacement variable HistValue is calculated as follows:

$$\text{HistValue}[cIdx]=1<<\text{StatCoeff}[cIdx]. \quad (8)$$

The HistValue can be used to calculate the local sum variable locSumAbs as described above. The HistValue can be updated once per TU from the first, non-zero, Golomb-Rice coded transform coefficient (abs_remainder[cIdx] or dec_abs_level[cIdx]) through a process of exponential moving average. When the first, non-zero, Golomb-Rice coded transform coefficient in a TU is coded as abs_remainder, the history counter for color component cIdx, StatCoeff[cIdx], is updated as the following:

$$\text{StatCoeff}[cIdx]=(\text{StatCoeff}[cIdx]+\text{Floor}(\text{Log }2(\text{abs\_remainder}[cIdx]))+2)>>1. \quad (9)$$

When the first, non-zero, Golomb-Rice coded transform coefficient in a TU is coded as dec_abs_level, the history counter for color component cIdx, StatCoeff[cIdx], is updated as the following:

$$\text{StatCoeff}[cIdx]=(\text{StatCoeff}[cIdx]+\text{Floor}(\text{Log }2(\text{dec\_abs\_level}[cIdx])))>>1. \quad (10)$$

The updated StatCoeff[cIdx] is used to calculate the replacement variable HistValue as shown in Eqn. (8) for the next TU of the current CTU or the first TU of the next CTU in the current CTU row.

Figure 8:
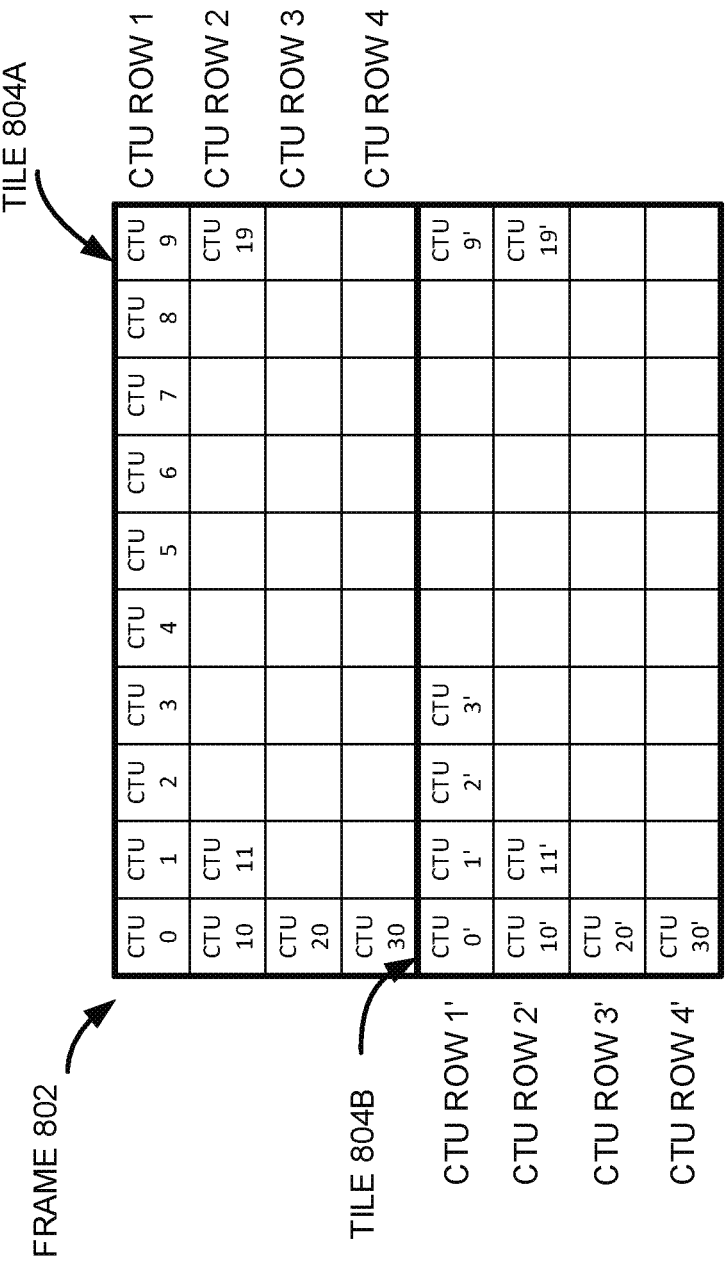
FIG. 8 depicts an example of a frame, the tiles and coding tree units contained in this frame for which the history counter is calculated according to some embodiments of the present disclosure.

FIG. 8 shows an example of a frame 802 and the CTUs contained in this frame. In this example, the frame 802 contains two tiles: tile 804A and tile 804B. Tile 804A contains four CTU rows—CTU rows 1-4. The first CTU row includes CTU 0 to CTU 9, the second CTU row includes CTU 10 to CTU 19, and so on. Likewise, tile 804B also contains four CTU rows—CTU rows 1'-4'. The first CTU row includes ten CTUs: CTU 0' to CTU 9', the second CTU row includes CTU 10' to CTU 19', and so on.

According to this embodiment, the initial value of StatCoeff[cIdx] for tile 804A can be determined according to Eqn. (5) or (6). Prior to coding the first TU of each CTU row among CTU rows 1-4, the replacement variable HistValue [cIdx] is calculated using Eqn. (8) using the initial value of StatCoeff[cIdx]. For example, prior to coding the first TU of CTU 0, the variable HistValue is calculated using Eqn. (8). This value of HistValue is used to determine the local sum variable locSumAbs for the coefficients in the first TU, which is further used to determine the Rice parameters for the respective coefficients of the first TU. The history counter StatCoeff may be updated according to Eqn. (9) or (10) when processing the first TU of the current CTU 0. Prior to processing the second TU in CTU 0, the current value of the StatCoeff is used to determine the HistValue for the second TU according to Eqn. (8). A similar process is then employed for the second TU to determine the Rice parameters using the HistValue and to update the StatCoeff. For the first TU in CTU 1, the HistValue is calculated according to Eqn. (8) using the latest StatCoeff from a TU in CTU 0. This process can repeat until the last CTU, CTU 9, in the current CTU row 1 is processed.

For the second CTU row of tile 804A, prior to coding the first TU of CTU 10, the first CTU of the second CTU row, the history counter StatCoeff is initialized according to Eqn. (5) or (6). A process similar to the process described above with respect to CTU row 1 is carried out for the TUs in the CTUs of the second CTU row. Likewise, prior to coding the first TU of each of CTU 20, and CTU 30, the variable StatCoeff is once again initialized according to Eqn. (5) or (6).

Tile 804B can be processed in a similar way. Prior to coding the first TU of each of CTU row 1'-4' (i.e., CTU 0', CTU 10', CTU 20', and CTU 30'), the value of StatCoeff [cIdx] is initialized according to Eqn. (5) or (6) and the history counter HistValue is calculated using Eqn. (8). The calculated history counter HistValue is used to calculate the locSumAbs and the Rice parameters for the TUs in the first CTU and remaining CTUs of the respective CTU rows. In addition, the history counter StatCoeff may be updated at most once in each TU according to Eqns. (9) or (10) and the updated value of StatCoeff is used to determine the HistValue for the next TU in the same CTU row.

While FIG. 8 is described as a frame 802 containing two tiles 804A and 804B, the same process applies to other scenarios, such as a slice containing multiple tiles, a frame containing multiple slices, and so on. In any of these scenarios, the value of the history counter StatCoeff[cIdx] is reset to an initial value prior to the coding of the first TU in each CTU row of a partition (e.g., a frame, a tile, or a slice) to eliminate the dependency of CTU rows for the Rice parameter derivation.

Possible specification changes to VVC shown as underlined are specified as follows.

The synchronization process for context variables is invoked as follows:
- If availableFlagT is equal to 1, the following applies:
  - The synchronization process for context variables as specified is invoked with TableStateIdx0Wpp and TableStateIdx1Wpp as inputs.
  - When sps_palette_enabled_flag is equal to 1, the synchronization process for palette predictor as specified in clause 0 is invoked.
  - When sps_persistent_Rice_adaptation_enabled_flag is equal to 1, the synchronization process for Rice parameter derivation as specified in clause 9.3.2.x1 is invoked.

9.3.2.x1 Synchronization process for Rice parameter derivation
This process synchronizes the values of the arrays StatCoeff as follows:
```
for( cIdx = 0; cIdx < 3; cIdx++ ) {
    StatCoeff [ cIdx ] = 2 * Floor( Log2( BitDepth - 10 ))
}
```

Another possible specification changes to the VVC are specified as follows for 9.3.2.1

- The array StatCoeff[ i ], with i = 0..2, is initialized as follows:
    StatCoeff[ i ] = sps_persistent_rice_adaptation_enabled_flag ? 2 * Floor( Log2( BitDepth − 10 ) : 0
- If the CTU is the first CTU in a slice or tile, the initialization process for context variables is invoked as specified in subclause 9.3.2.2 and the array PredictorPaletteSize[ chType ], with chType = 0, 1, is initialized to 0.
- Otherwise, when sps_entropy_coding_sync_enabled_flag is equal to 1 and CtbAddrX is equal to CtbToTileColBd[ CtbAddrX ], the following applies:

The Bit Depth of Video Samples

The bit depth of input video supported by VVC version 2 can be more than 10 bits. The higher bit depth of video can provide a higher visual quality for the decoded video with lower compression distortion. To support the high bit depth of input video, the semantics of the corresponding SPS (Sequence Parameter Set) syntax element sps_bitdepth_minus8 and VPS (Video Parameter Set) syntax element vps_ols_dpb_bitdepth_minus8[i] can be changed as follows.

sps_bitdepth_minus8 specifies the bit depth of the samples of the luma and chroma arrays, BitDepth, and the value of the luma and chroma quantization parameter range offset, QpBdOffset, as follows:
    BitDepth = 8 + sps_bitdepth_minus8                              (x1)
    QpBdOffset = 6 * sps_bitdepth_minus8                            (x2)
sps_bitdepth_minus8 shall be in the range of 0 to 8, inclusive.
When sps_video_parameter_set_id is greater than 0 and the SPS is referenced by a layer that is included in the i-th multi-layer OLS specified by the VPS for any i in the range of 0 to NumMultiLayerOlss − 1, inclusive, it is a requirement of bitstream conformance that the value of sps_bitdepth_minus8 shall be less than or equal to the value of vps_ols_dpb_bitdepth_minus8[ i ].
vps_ols_dpb_bitdepth_minus8[ i ] specifies the greatest allowed value of sps_bitdepth_minus8 for all SPSs that are referred to by CLVSs in the CVS for the i-th multi-layer OLS. The value of vps_ols_dpb_bitdepth_minus8[ i ] shall be in the range of 0 to 8, inclusive.
   NOTE 2-For decoding the i-th multi-layer OLS, the decoder could safely allocate memory for the DPB according to the values of the syntax elements vps_ols_dpb_pic_width[ i ], vps_ols_dpb_pic_height[ i ], vps_ols_dpb_chroma_format[ i ], and vps_ols_dpb_bitdepth_minus8[ i ].

As can be seen from the above, the bit depth of the samples of the luma and chroma arrays, BitDepth, can be derived according to Eqn. (x1) based on the SPS syntax element sps_bitdepth_minus8. With the determined Bit-Depth value, the history counter StatCoeff, the replacement variable HistValue, and the Rice parameter can be derived as discussed above.

The VPS syntax element vps_ols_dpb_bitdepth_minus8[i] can be used to derive the size of the decoded picture buffer (DPB). There may be multiple video layers for a coded bitstream. Video Parameter Set is used to specify the corresponding syntax elements. For video decoding, DPB can be used for storing reference pictures so that previously coded pictures can be used to generate prediction signals to use when coding other pictures. The DPB can also be used to reorder the decoded pictures so that they can be output and/or displayed in the correct order. The DPB can also be used for output delay specified for the hypothetical reference decoder. The decoded pictures can be hold in the DPB for a pre-determined time period specified for the hypothetical reference decoder and output after the pre-determined time period has passed.

In order to safely allocate memory for the DPB, the size of this DPB is decided by the syntax elements vps_ols_dpb_pic_width[i], vps_ols_dpb_pic_height[i], vps_ols_dpb_chroma_format[i], and vps_ols_dpb_bitdepth_minus8[i] as follows.

```
picture_size1 (in bits) = vps_ols_dpb_pic_width[ i ] * vps_ols_dpb_pic_height[ i ] *
                        (vps_ols_dpb_bitdepth_minus8[ i ] + 8)
if (vps_ols_dpb_chroma_format[ i ]== 0) // Monochrome
    picture_size = picture_size1;
else if (vps_ols_dpb_chroma_format[ i ]== 1) // 4:2:0
    picture_size = 1.5 * picture_size1;
else if (vps_ols_dpb_chroma_format[ i ]== 2 // 4:2:2
    picture_size = 2 * picture_size1;
else if (vps_ols_dpb_chroma_format[ i ]== 3 // 4:4:4
    picture_size = 3 * picture_size1;
```

The size of DPB will be determined by picture_size accordingly. In other words, the size of the DPB can be determined according to the chroma format of the samples. If the video frames are monochrome frames, the size of a frame to be buffered is determined to be the basic picture size picture_size1. If the color subsampling of the color video frames is 4:2:0, the size of a frame is determined to be 1.5 of the basic picture size picture_size1; if the color subsampling of the color video frames is 4:2:2, the size of a frame is determined to be twice of the basic picture size picture_size1; if the color subsampling of the color video frames is 4:4:4, the size of a frame is determined to be three times of the basic picture size picture_size1. The size of the DPB can be determined to be the number of frames to be stored in the DPB times the size of a frame according to the color subsampling.

Figure 9:
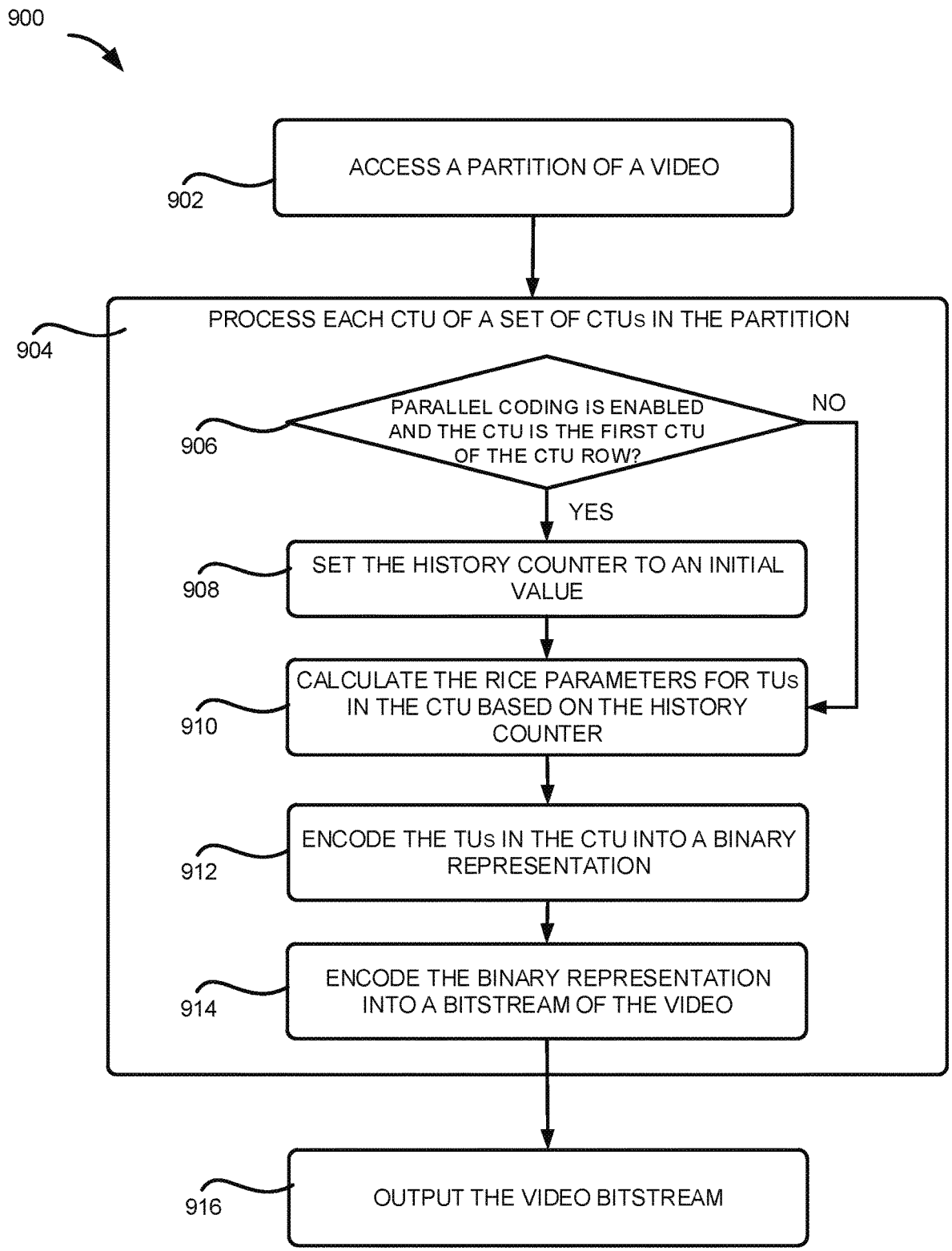
FIG. 9 depicts an example of a process for encoding a partition for a video according to some embodiments of the present disclosure.

FIG. 9 depicts an example of a process 900 for encoding a partition for a video, according to some embodiments of the present disclosure. One or more computing devices (e.g., the computing device implementing the video encoder 100) implement operations depicted in FIG. 9 by executing suitable program code (e.g., the program code implementing the entropy coding module 116). For illustrative purposes, the process 900 is described with reference to some examples depicted in the figures. Other implementations, however, are possible.

At block 902, the process 900 involves accessing a partition of a video signal. The partition can be a video frame, a slice, or a tile or any type of partition processed by a video encoder as a unit when performing the encoding. The partition includes a set of CTUs arranged in CTU rows as shown in FIG. 8. Each CTU includes one or more CUs and each CTU includes multiple TUs for encoding as shown in the example of FIG. 6.

At block 904, which includes 906-914, the process 900 involves processing each CTU of the set of CTUs in the partition to encode the partition into bits. At block 906, the process 900 involves determining whether the parallel coding mechanism is enabled and the current CTU is the first CTU of the CTU row. In some examples, the parallel coding may be indicated by a flag with a value 0 indicating parallel coding is disabled and value 1 indicating parallel coding is enabled. If it is determined that the parallel coding mechanism is enabled and the current CTU is the first CTU of the CTU row, the process 900 involves setting, at block 908, the history counter StatCoeff to an initial value. As discussed above, the initial value of the history counter may be set according to Eqn. (5) or (6) if the history-based Rice parameter derivation is enabled; otherwise, the initial value of the history counter is set to zero.

If it is determined that the parallel coding mechanism is not enabled or that the current CTU is not the first CTU of the CTU row, or after setting the history counter at block 908, the process 900 involves, at block 910, calculating the Rice parameters for the TUs in the CTU based on the history counter. As described above in detail with respect to FIGS. 6-8, if the history counter is reset at block 908, the Rice parameters for the TUs in the CTU are calculated based on the reset history counter or subsequently updated history counter. If the history counter is not reset at block 908, the Rice parameters for the TUs in the CTU are calculated based on the history counter updated in the previous CTU or subsequently updated history counter in the current CTU.

At block 912, the process 900 involves encoding the TUs in the CTU into binary representation based on the calculated Rice parameters, such as through a combination of truncated Rice (TR) and limited k-th order EGK as specified in the VVC specification. At block 914, the process 900 involves encoding the binary representation of the CTU into the bits for inclusion in the bitstream of the video. The encoding can be performed, for example, using the context-adaptive binary arithmetic coding (CABAC) discussed above. At block 916, the process 900 involves outputting the encoded video bitstream.

Figure 10:
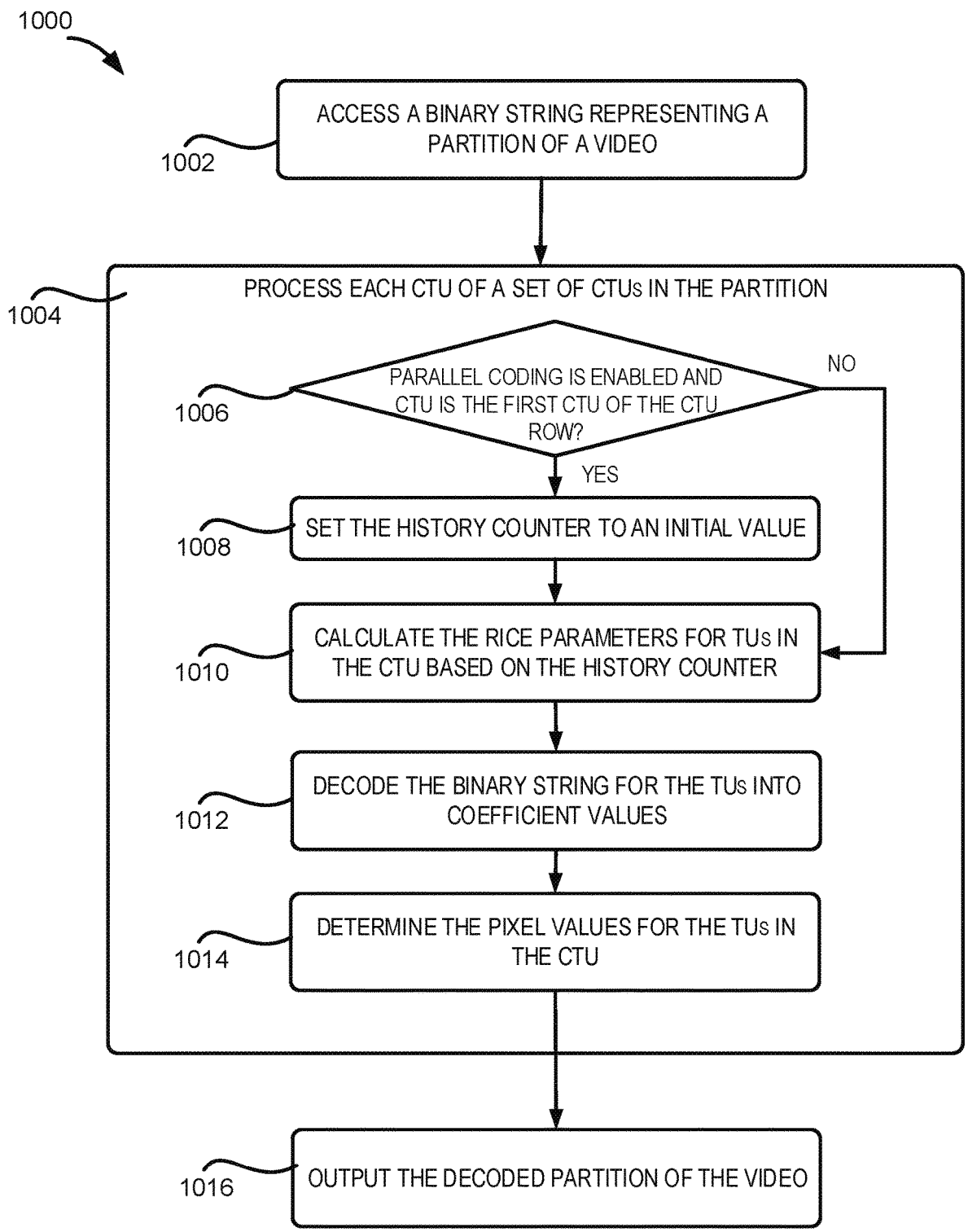
FIG. 10 depicts an example of a process for decoding a partition of a video according to some embodiments of the present disclosure.

FIG. 10 depicts an example of a process 1000 for decoding a partition for a video, according to some embodiments of the present disclosure. One or more computing devices implement operations depicted in FIG. 10 by executing suitable program code. For example, a computing device implementing the video decoder 200 may implement the operations depicted in FIG. 10 by executing the program code for the entropy decoding module 216, the inverse quantization module 218, and the inverse transform module 219. For illustrative purposes, the process 1000 is described with reference to some examples depicted in the figures. Other implementations, however, are possible.

At block 1002, the process 1000 involves accessing a binary string or a binary representation that represents a partition of a video signal. The partition can be a video frame, a slice, or a tile or any type of partition processed by a video encoder as a unit when performing the encoding. The partition includes a set of CTUs arranged in CTU rows as shown in FIG. 8. Each CTU includes one or more CUs and each CTU includes multiple TUs for encoding as shown in the example of FIG. 6.

At block 1004, which includes 1006-1014, the process 1000 involves processing the binary string for each CTU of the set of CTUs in the partition to generate decoded samples for the partition. At block 1006, the process 1000 involves determining whether the parallel coding mechanism is enabled and the current CTU is the first CTU of the CTU row. The parallel coding may be indicated by a flag with a value 0 indicating parallel coding is disabled and value 1 indicating parallel coding is enabled. If it is determined that the parallel coding mechanism is enabled and the current CTU is the first CTU of the CTU row, the process 1000 involves setting, at block 1008, the history counter StatCoeff to an initial value. As discussed above, the initial value of the history counter may be set according to Eqn. (5) or (6) if the history-based Rice parameter derivation is enabled; otherwise, the initial value of the history counter is set to zero.

If it is determined that the parallel coding mechanism is not enabled or that the current CTU is not the first CTU of the CTU row, or after setting the history counter at block 1008, the process 1000 involves, at block 1010, calculating the Rice parameters for the TUs in the CTU based on the history counter. As described above in detail with respect to FIGS. 6-8, if the history counter is reset at block 1008, the Rice parameters for the TUs in the CTU are calculated based on the reset history counter or subsequently updated history counter. If the history counter is not reset at block 1008, the Rice parameters for the TUs in the CTU are calculated based on the history counter updated in the previous CTU or subsequently updated history counter in the current CTU.

At block 1012, the process 1000 involves decoding the binary strings or binary representations of TUs in the CTU into coefficient values based on the calculated Rice parameters, such as through a combination of truncated Rice (TR) and limited k-th order EGK as specified in the VVC specification. At block 1014, the process 1000 involves reconstructing the pixel values for the TUs in the CTU through, for example, reverse quantization and reversion transformation as discussed above with respect to FIG. 2. At block 1016, the process 1000 involves output the decoded partition of the video.

In another embodiment, the dependency between the CTUs when calculating the history counter StatCoeff is aligned with the dependency between CTUs in the parallel coding mechanism, such as the WPP. For example, the history counter StatCoeff for a CTU row of a partition (e.g., a frame, a tile or a slice) is calculated based on coefficient values in the first N or fewer CTUs in the previous CTU row, wherein N is the maximum delay between two consecutive CTU rows permitted in the parallel coding mechanism. In this way, the dependency between CTUs in two consecutive CTU rows when calculating the history counter StatCoeff is limited to be no more than (and thus is aligned with) the dependency between CTUs when performing the parallel processing.

This embodiment can be implemented using a storage-synchronization process. For example, in the WPP described above, the delay between two consecutive CTU rows is one CTU and thus N=1. In the storage process, after the last TU of the first CTU in each CTU row (except for the last CTU row) is coded, the StatCoeff[cIdx] can be saved in a storage variable StatCoeffWpp[cIdx]. For each CTU row except for the first CTU row, prior to the first TU coding, the synchronization process for the Rice parameter derivation is applied. In the synchronization process, StatCoeff[cIdx] is synchronized with the saved StatCoeffWpp[cIdx] from the preceding CTU row.

As discussed above, prior to the first TU coding in each CTU row, the variable HistValue is calculated as follows:

$$\text{HistValue}[cIdx]=1<<\text{StatCoeff}[cIdx]. \qquad (11)$$

If the current CTU row is the first CTU row of the partition, the StatCoeff[cIdx] can be initialized according to Eqn. (5) or (6). The calculated HistValue can be used to determine the local sum variable locSumAbs which in turn is used to determine the Rice parameters for the TUs in the current CTU. The StatCoeff can be updated once per TU from the first, non-zero, Golomb-Rice coded transform coefficient (abs_remainder[cIdx] or dec_abs_level[cIdx]) through a process of exponential moving average as described above with respect to Eqns. (9) and (10).

After the last TU of the first CTU in the first CTU row is coded, the StatCoeff[cIdx] can be saved as StatCoeffWpp[cIdx] in a storage step as follows:

$$\text{StatCoeffWpp}[cIdx]=\text{StatCoeff}[cIdx]. \qquad (12)$$

The coding of the remaining CTUs in the first CTU row can be performed in a similar way as described above with respect to the first embodiment.

Prior to the first TU coding in the second CTU row and any subsequent CTU row, the StatCoeff[cIdx] can be obtained through a synchronization step:

$$\text{StatCoeff}[cIdx]=\text{StatCoeffWpp}[cIdx]. \qquad (13)$$

Using the obtained StatCoeff[cIdx] values, the HistValue is calculated according to Eqn. (11). The remaining process for the CTU row is the same as that of the first CTU row.

Possible VVC specification changes are specified as follows (changes are shown as underlined).

---

9.3.1 General

When sps_persistent_Rice_adaptation_enabled_flag is equal to 1, the storage process for Rice parameter derivation using statistics accumulated from previous TUs is applied as follows:

- When ending the parsing of the CTU syntax in clause 7.3.11.2 and the decoding process of the last CU in the CTU in clause 8.1.2, sps_entropy_coding_sync_enabled_flag is equal to 1 and CtbAddrX is equal to CtbToTileColBd[ CtbAddrX ], the storage process for Rice parameter derivation as speficied in clause 9.3.2.x2 is invoked.

9.3.2.1 General

The synchronization process for context variables is invoked as follows:
- If availableFlagT is equal to 1, the following applies:
  - The synchronization process for context variables as specified in clause 9.3.2.4 is invoked with TableStateIdx0Wpp and TableStateIdx1Wpp as inputs.
  - When sps_palette_enabled_flag is equal to 1, the synchronization process for palette predictor as specified in clause 9.3.2.7 is invoked.
  - When sps_persistent_Rice_adaptation_enabled_flag is equal to 1, the synchronization process for Rice parameter derivation as specified in clause 9.3.2.x1 is invoked.

9.3.2.x2 Storage process for Rice parameter derivation

This process stores the values of the arrays StatCoeff in the arrays StatCoeffWpp as follows:

```
for( cIdx = 0; cIdx < 3; cIdx++ ) {
    StatCoeffWpp [ cIdx ] = StatCoeff [ cIdx ]
}
```

-continued

```
9.3.2.x1 Synchronization process for Rice parameter derivation
This process synchronizes the values of the arrays StatCoeff in the arrays StatCoeffWpp as
follows:
    for( cIdx = 0; cIdx < 3; cIdx++ ) {
        StatCoeff [ cIdx ] = StatCoeffWpp[ cIdx ]
    }
```

Alternative History-Based Rice Parameter Derivation

The history-based Rice parameter derivation may be implemented in an alternative way. In this alternative implementation, if the CTU is the first CTU in a partition (e.g., a picture, a slice, or a tile), the HistValue is initialed with the initial value of StatCoeff[cIdx] as follows:

$$\text{HistValue} = \text{sps\_persistent\_Rice\_adaptation\_enabled\_flag} ? 1 << \text{StatCoeff}[\text{cIdx}]:0. \quad (14)$$

This initial HistValue is used for coding the first abs_remainder[cIdx] or dec_abs_level[cIdx] until HistValue is updated according to the following rules. When the first, non-zero, Golomb-Rice coded transform coefficient in a TU is coded as abs_remainder, the history counter for color component cIdx is updated as the following:

$$\text{StatCoeff}[\text{cIdx}] = (\text{StatCoeff}[\text{cIdx}] + \text{Floor}(\text{Log }2(\text{abs\_remainder}[\text{cIdx}])) + 2) >> 1. \quad (15)$$

When the first, non-zero, Golomb-Rice coded transform coefficient in a TU is coded as dec_abs_level, the history counter for color component cIdx is updated as the following:

$$\text{StatCoeff}[\text{cIdx}] = (\text{StatCoeff}[\text{cIdx}] + \text{Floor}(\text{Log }2(\text{dec\_abs\_level}[\text{cIdx}]))) >> 1. \quad (16)$$

Once the history counter StatCoeff[cIdx] is updated, the HistValue will be updated as shown in Eqn. (17) and the updated HistValue will be used in the derivation of Rice parameter for remaining abs_remainder and dec_abs_level syntax elements until the new StatCoeff[cIdx] and HistValue [cIdx] are updated again.

$$\text{HistValue}[\text{cIdx}] = 1 << \text{StatCoeff}[\text{cIdx}]. \quad (17)$$

Based upon the current VVC specifications, possible specification changes are specified as follows.

Change clause 7.3.11.11 (Residual coding syntax) as follows (additions are underlined):

| | Descriptor |
|---|---|
| residual_coding( x0, y0, log2TbWidth, log2TbHeight, cIdx ) { | |
| ... | |
|   lastScanPos = numSbCoeff | |
|   lastSubBlock = ( | |
| 1 << ( log2TbWidth + log2TbHeight − ( log2SbW + log2SbH ) ) ) − 1 | |
|   ~~HistValue = sps_persistent_rice_adaptation_enabled_flag ?~~ | |
| ~~( 1 << StatCoeff[cIdx] ) : 0~~ | |
|   <u>updateHist = sps_persistent_rice_adaptation_enabled_flag ? 1 : 0</u> | |
| ... | |
|   for( n = firstPosMode0; n > firstPosMode1; n− − ) { | |
|     xC = ( xS << log2SbW ) + | |
| DiagScanOrder[ log2SbW ][ log2SbH ][ n ][ 0 ] | |
|     yC = ( yS << log2SbH ) + | |
| DiagScanOrder[ log2SbW ][ log2SbH ][ n ][ 1 ] | |
|     if( abs_level_gtx_flag[ n ][ 1 ] ) { | |
|       abs_remainder[ n ] | ae(v) |
|       <u>if( updateHist && abs_remainder[ n ] > 0 ) {</u> | |
|         <u>StatCoeff[ cIdx ] = ( StatCoeff[ cIdx ] +</u> | |
|           <u>Floor( Log2( abs_remainder[ n ] ) ) + 2 ) >> 1</u> | |
|         <u>updateHist = 0</u> | |
|         <u>HistValue = 1 << StatCoeff[ cIdx ]</u> | |
|       <u>}</u> | |
|     } | |
|     AbsLevel[ xC ][ yC ] = AbsLevelPass1[ xC ][ yC ] +2 * abs_remainder[ n ] | |
|   } | |
|   for( n = firstPosMode1; n >= 0; n− − ) { | |
|     xC = ( xS << log2SbW ) + | |
| DiagScanOrder[ log2SbW ][ log2SbH ][ n ][ 0 ] | |
|     yC = ( yS << log2SbH ) + | |
| DiagScanOrder[ log2SbW ][ log2SbH ][ n ][ 1 ] | |
|     if( sb_coded_flag[ xS ][ yS ] ) { | |
|       dec_abs_level[ n ] | ae(v) |
|       <u>if( updateHist && dec_abs_level[ n ] > 0 ) {</u> | |
|         <u>StatCoeff[ cIdx ] = ( StatCoeff[ cIdx ] +</u> | |
|           <u>Floor( Log2( dec_abs_level[ n ] ) ) ) >> 1</u> | |
|         <u>updateHist = 0</u> | |
|         <u>HistValue = 1 << StatCoeff[ cIdx ]</u> | |
|       <u>}</u> | |
|     } | |
|     if( AbsLevel[ xC ][ yC ] > 0 ) { | |
|       if( lastSigScanPosSb = = −1 ) | |
|         lastSigScanPosSb = n | |
|       firstSigScanPosSb = n | |

|  | Descriptor |
|---|---|
|     }<br>   if( sh_dep_quant_used_flag )<br>      QState = QStateTransTable[ QState ][ AbsLevel[ xC ][ yC ] & 1 ]<br>}<br>....... | |

To resolve the dependency conflict between parallel coding and the alternative history-based Rice parameter derivation, both StatCoeff[cIdx] and HistValue[cIdx] for each color component are saved after the last TU of the first CTU in each CTU row is coded. The saved values for StatCoeff [cIdx] and HistValue[cIdx] can be used to initialize the StatCoeff[cIdx] and HistValue[cIdx] before the first TU of the first CTU of a subsequent CTU row is processed.

This embodiment can also be implemented using a storage-synchronization process. For example, in the storage process, StatCoeff[cIdx] and HistValue[cIdx] can be saved in storage variables, such as StatCoeffWpp[cIdx] and HistValueWpp[cIdx] as shown in Eqns. (18) and (19), respectively, after the last TU of the first CTU in each CTU row is processed.

$$StatCoeffWpp[cIdx]=StatCoeff[cIdx] \quad (18)$$

$$HistValueWpp[cIdx]=HistValue[cIdx]. \quad (19)$$

For each CTU row except for the first CTU row, prior to the first TU coding, the synchronization process for Rice parameter derivation is applied. For example, StatCoeff [cIdx] and HistValue[cIdx] are synchronized with the saved StatCoeffWpp[cIdx] and HistValueWpp[cIdx] from the preceding CTU row, respectively, as shown in Eqns. (20) and (21).

$$StatCoeff[cIdx]=StatCoeffWpp[cIdx] \quad (20)$$

$$HistValue[cIdx]=HistValueWpp[cIdx]. \quad (21)$$

The synchronized variable HistValue is used to code the first abs_remainder[cIdx] or dec_abs_level[cIdx] until HistValue is updated.

As discussed above, StatCoeff[cIdx] can be updated once per TU from the first, non-zero, Golomb-Rice coded transform coefficient (abs_remainder[cIdx] or dec_abs_level [cIdx]) as shown in Eqn. (15) or Eqn. (16). Once the history counter StatCoeff[cIdx] is updated, the HistValue will be updated according to Eqn. (17) and the updated HistValue will be used in the derivation of Rice parameter for remaining abs_remainder and dec_abs_level syntax elements until the new StatCoeff[cIdx] and HistValue are updated again.

Based upon the current VVC specifications, possible specification changes indicated as underlined are specified as follows.

9.3.1 General
When sps_persistent_Rice_adaptation_enabled_flag is equal to 1, the storage process for Rice parameter derivation using statistics accumulated from previous TUs is applied as follows:
- When ending the parsing of the CTU syntax in clause 7.3.11.2 and the decoding process of the last CU in the CTU in clause 8.1.2, sps_entropy_coding_sync_enabled_flag is equal to 1 and CtbAddrX is equal to CtbToTileColBd[ CtbAddrX ], the storage process for Rice parameter derivation as speficied in clause 9.3.2.x2 is invoked.

9.3.2.1 General
The synchronization process for context variables is invoked as follows:
- If availableFlagT is equal to 1, the following applies:
- The synchronization process for context variables as specified in clause 9.3.2.4 is invoked with TableStateIdx0Wpp and TableStateIdx1Wpp as inputs.
- When sps_palette_enabled_flag is equal to 1, the synchronization process for palette predictor as specified in clause 9.3.2.7 is invoked.
- When sps_persistent_Rice_adaptation_enabled_flag is equal to 1, the synchronization process for Rice parameter derivation as specified in clause 9.3.2.x1 is invoked.

9.3.2.x2 Storage process for Rice parameter derivation
This process stores the values of the arrays StatCoeff and HistValue in the arrays StatCoeffWpp and HistValueWPP as follows:
    for( cIdx = 0; cIdx < 3; cIdx++ ) {
        StatCoeffWpp [ cIdx ] = StatCoeff[ cIdx ]
        HistValueWpp [ cIdx ] = HistValue[ cIdx ]
    }

9.3.2.x1 Synchronization process for Rice parameter derivation
This process synchronizes the values of the arrays StatCoeff and HistValue in the arrays StatCoeffWpp and HistValueWpp as follows:
    for( cIdx = 0; cIdx < 3; cIdx++ ) {
        StatCoeff [ cIdx ] = StatCoeffWpp[ cIdx ]
        HistValue[ cIdx ] = HistValueWpp[ cIdx ]
    }

Figure 11:
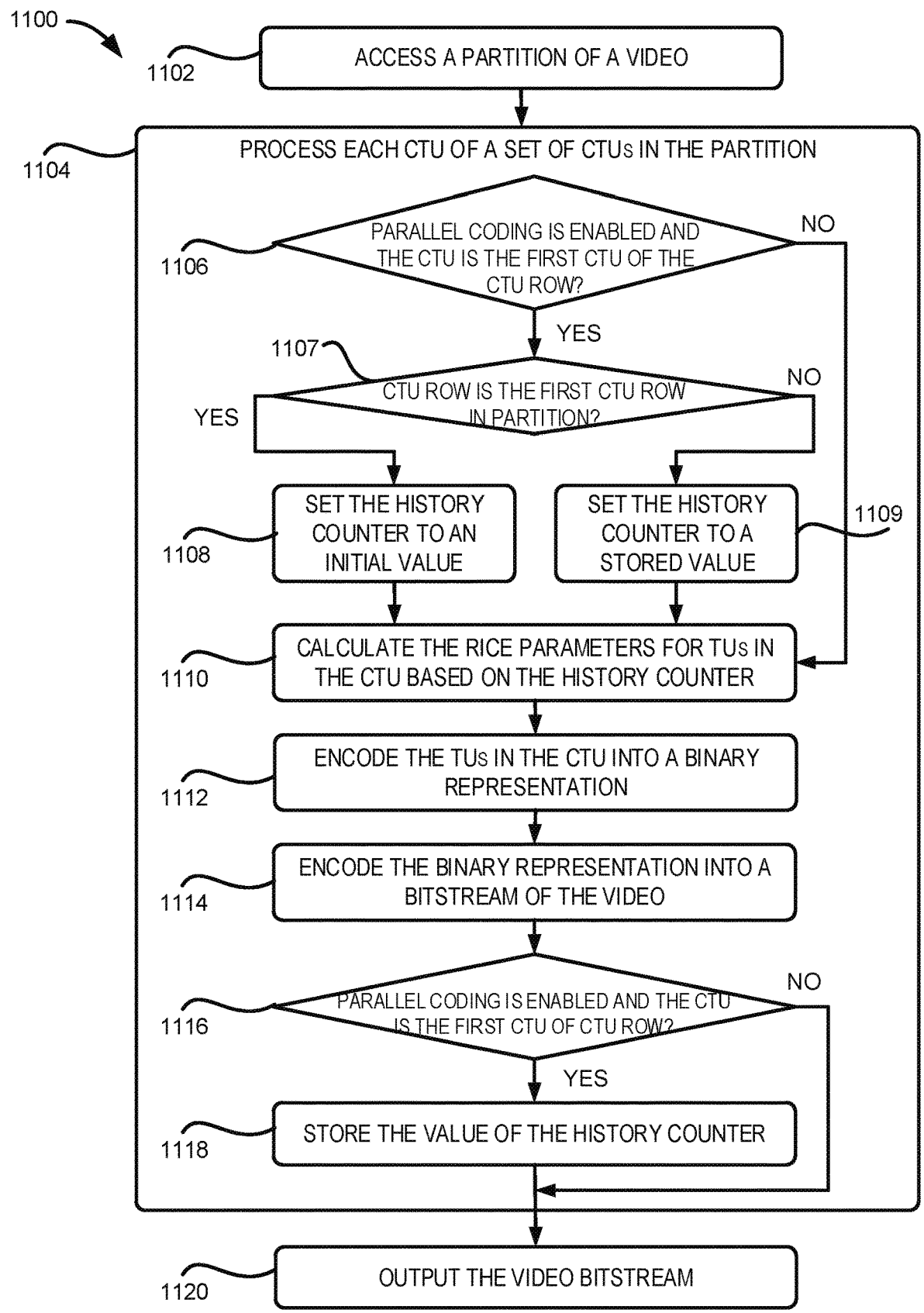
FIG. 11 depicts another example of a process for encoding a partition for a video according to some embodiments of the present disclosure.

FIG. 11 depicts an example of a process 1100 for encoding a partition for a video, according to some embodiments of the present disclosure. One or more computing devices (e.g., the computing device implementing the video encoder 100) implement operations depicted in FIG. 11 by executing suitable program code (e.g., the program code implementing the entropy coding module 116). For illustrative purposes, the process 1100 is described with reference to some examples depicted in the figures. Other implementations, however, are possible.

At block 1102, the process 1100 involves accessing a partition of a video signal. The partition can be a video frame, a slice, or a tile or any type of partition processed by a video encoder as a unit when performing the encoding. The partition includes a set of CTUs arranged in CTU rows as shown in FIG. 8. Each CTU includes one or more CUs and each CTU includes multiple TUs for encoding as shown in the example of FIG. 6.

At block 1104, which includes 1106-1118, the process 1100 involves processing each CTU of the set of CTUs in the partition to encode the partition into bits. At block 1106, the process 1100 involves determining whether the parallel coding mechanism is enabled and the current CTU is the first CTU of the CTU row. In some examples, the parallel coding may be indicated by a flag with a value 0 indicating parallel coding is disabled and value 1 indicating parallel coding is enabled. If it is determined that the parallel coding mechanism is enabled and the current CTU is the first CTU of the CTU row, the process 1100 involves determining, at block 1107, whether the current CTU row is the first CTU row in the partition. If so, the process 1100 involves setting, at block 1108, the history counter StatCoeff to an initial value. As discussed above, the initial value of the history counter may be set according to Eqn. (5) or (6). If the current CTU row is not the first CTU row in the partition, the process 1100 involves setting, at block 1109, the history counter StatCoeff to a value stored in a history counter storage variable as shown in Eqn. (13) or (20). In some examples, such as when the alternative Rice parameter derivation is utilized, the value of the replacement variable HistValue can also be reset to a stored value as shown in Eqn. (21).

If it is determined that the parallel coding mechanism is not enabled or that the current CTU is not the first CTU of the CTU row, or after setting the value of the history counter in block 1108 or 1109, the process 1100 involves, at block 1110, calculating the Rice parameters for the TUs in the CTU based on the history counter (and the replacement variable HistValue if it is also reset). As described above (e.g., with respect to FIG. 8 or in the alternative Rice parameter derivation), if the value of the history counter is reset at block 1108 or 1109, the Rice parameters for the TUs in the CTU are calculated based on the reset history counter or subsequently updated history counter. If the history counter is not reset at block 1108 or 1109, the Rice parameters for the TUs in the CTU are calculated based on the history counter updated in the previous CTU or subsequently updated history counter in the current CTU.

At block 1112, the process 1100 involves encoding the TUs in the CTU into binary representation based on the calculated Rice parameters, such as through a combination of truncated Rice (TR) and limited k-th order EGK as specified in the VVC specification. At block 1114, the process 1100 involves encoding the binary representation of the CTU into the bits for inclusion in the bitstream of the video. The encoding can be performed, for example, using the context-adaptive binary arithmetic coding (CABAC) discussed above.

At block 1116, the process 1100 involves determining whether the parallel coding is enabled and the CTU is the first CTU of the current CTU row. If so, the process 1100 involves, at block 1118, storing the value of the history counter in a history counter storage variable, as shown in Eqn. (12) or (18). In some examples, such as when the alternative Rice parameter derivation is utilized, the value of the replacement variable HistValue can also be stored in a storage variable as shown in Eqn. (19). At block 1120, the process 1100 involves outputting the encoded video bitstream.

In some scenarios, a CTU in a non-first CTU row may be at the boundary of the partition. For example, the first CTU in the second CTU row does not have a CTU in the partition that locates on the top of this CTU. In these scenarios, the history counter for this CTU can be set to an initial value instead of the stored value. In this case, a new block 1107' can be added to FIG. 11 between block 1107 and block 1109 to determine if the CTU is at the boundary of the partition (e.g., the CTU does not have a top neighboring CTU within the partition). If so, the process 1100 proceeds to block 1108 to set the history counter to an initial value; if not, the process 1100 proceeds to block 1109 to set the history counter to a stored value. The rest blocks of FIG. 11 can remain the same.

Figure 12:
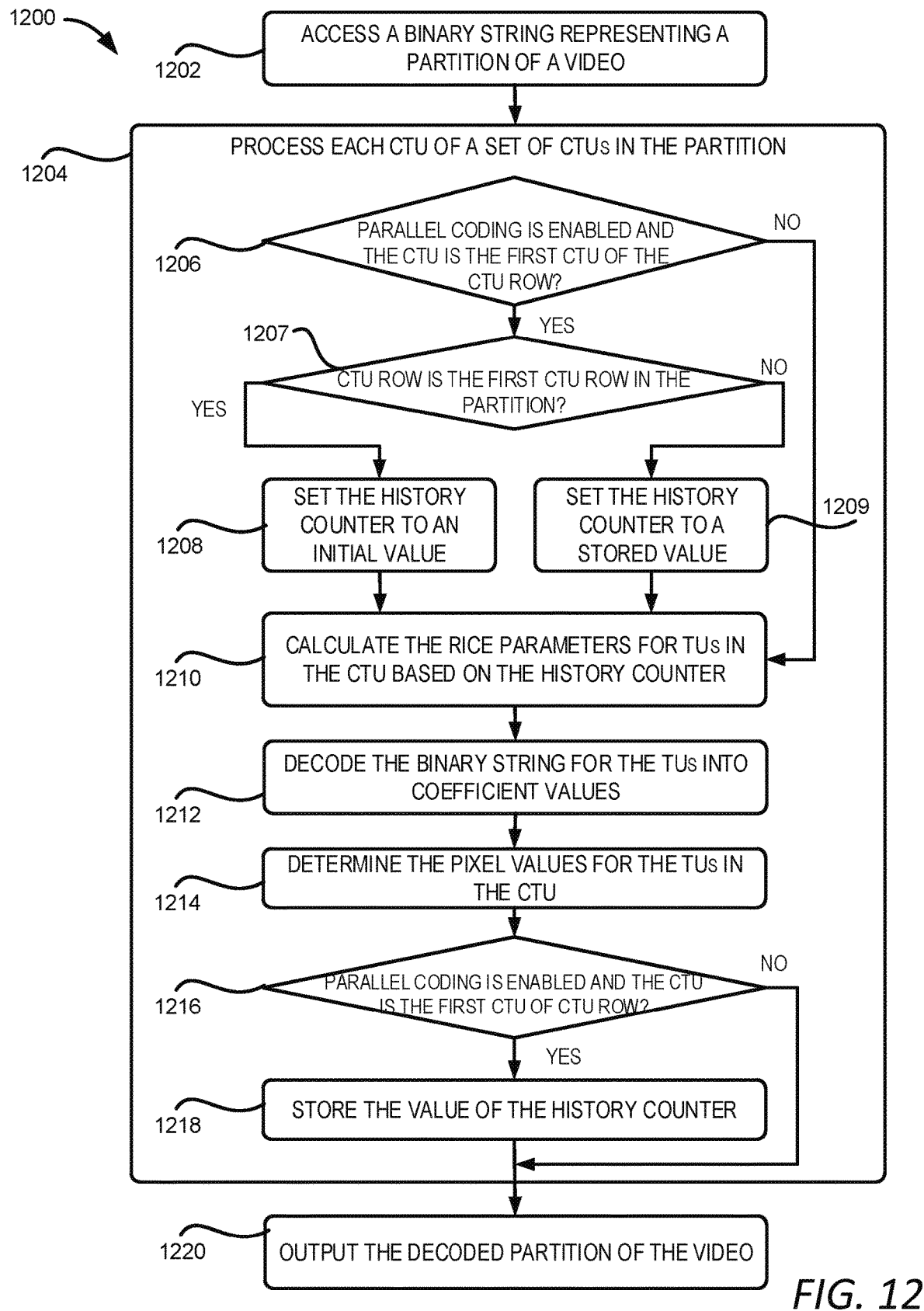
FIG. 12 depicts another example of a process for decoding a partition for a video according to some embodiments of the present disclosure.

FIG. 12 depicts an example of a process 1200 for decoding a partition for a video, according to some embodiments of the present disclosure. One or more computing devices implement operations depicted in FIG. 12 by executing suitable program code. For example, a computing device implementing the video decoder 200 may implement the operations depicted in FIG. 12 by executing the program code for the entropy decoding module 216, the inverse quantization module 218, and the inverse transform module 219. For illustrative purposes, the process 1200 is described with reference to some examples depicted in the figures. Other implementations, however, are possible.

At block 1202, the process 1200 involves accessing a binary string or a binary representation that represents a partition of a video signal. The partition can be a video frame, a slice, or a tile or any type of partition processed by a video encoder as a unit when performing the encoding. The partition includes a set of CTUs arranged in CTU rows as shown in FIG. 8. Each CTU includes one or more CUs and each CTU includes multiple TUs for encoding as shown in the example of FIG. 6.

At block 1204, which includes 1206-1218, the process 1200 involves processing the binary string for each CTU of the set of CTUs in the partition to generate decoded samples for the partition. At block 1206, the process 1200 involves determining whether the parallel coding mechanism is enabled and the current CTU is the first CTU of the CTU row. The parallel coding may be indicated by a flag with a value 0 indicating parallel coding is disabled and value 1 indicating parallel coding is enabled. If it is determined that the parallel coding mechanism is enabled and the current CTU is the first CTU of the CTU row, the process 1200 involves determining, at block 1207, whether the current CTU row is the first CTU row in the partition. If so, the process 1200 involves setting, at block 1208, the history counter StatCoeff to an initial value. As discussed above, the initial value of the history counter may be set according to Eqn. (5) or (6). If the current CTU row is not the first CTU row in the partition, the process 1200 involves setting, at block 1209, the history counter StatCoeff to a value stored in a history counter storage variable as shown in Eqn. (13) or (20). In some examples, such as when the alternative Rice parameter derivation is utilized, the value of the replacement variable HistValue can also be reset to a stored value as shown in Eqn. (21).

If it is determined that the parallel coding mechanism is not enabled or that the current CTU is not the first CTU of the CTU row, or after setting the history counter at block 1208 or 1209, the process 1200 involves, at block 1210, calculating the Rice parameters for the TUs in the CTU based on the history counter (and the replacement variable HistValue if its value is also set). As described above (e.g., with respect to FIG. 8 or in the alternative Rice parameter derivation), if the value of the history counter is reset at block 1208 or 1209, the Rice parameters for the TUs in the CTU are calculated based on the reset history counter or subsequently updated history counter. If the history counter is not reset at block 1208 or 1209, the Rice parameters for the TUs in the CTU are calculated based on the history counter updated in the previous CTU or subsequently updated history counter in the current CTU.

7.3.2.22 Sequence Parameter Set Range Extension Syntax (Additions are Underlined)

|  | Descriptor |
|---|---|
| sps_range_extension( ) { |  |
|   sps_extended_precision_flag | u(1) |
|   if( sps_transform_skip_enabled_flag ) |  |
|     sps_ts_residual_coding_rice_present_in_sh_flag | u(1) |
|   sps_rrc_rice_extension_flag | u(1) |
|   if(sps_entropy_coding_sync_enabled_flag) |  |
|     sps_persistent_rice_adaptation_enabled_flag | u(1) |
|   sps_reverse_last_sig_coeff_enabled_flag | u(1) |
| } |  |

As another example, the corresponding semantics are changed as follows (changes are underlined).

> sps_entropy_coding_sync_enabled_flag equal to 1 specifies that a specific synchronization process for context variables is invoked before decoding the CTU that includes the first CTB of a row of CTBs in each tile in each picture referring to the SPS, and a specific storage process for context variables is invoked after decoding the CTU that includes the first CTB of a row of CTBs in each tile in each picture referring to the SPS. sps_entropy_coding_sync_enabled_flag equal to 0 specifies that no specific synchronization process for context variables is required to be invoked before decoding the CTU that includes the first CTB of a row of CTBs in each tile in each picture referring to the SPS, and no specific storage process for context variables is required to be invoked after decoding the CTU that includes the first CTB of a row of CTBs in each tile in each picture referring to the SPS. When sps_persistent_Rice_adaptation_enabled_flag is equal to 1, the value of sps entropy coding sync enabled flag shall be 0.
> sps_persistent_Rice_adaptation_enabled_flag equal to 1 specifies that Rice parameter derivation for the binarization of abs_remainder[ ] and dec_abs_level[ ] is initialized at the start of each TU using statistics accumulated from previous TUs.
> sps_persistent_Rice_adaptation_enabled_flag equal to 0 specifies that no previous TU state is used in Rice parameter derivation. When not present, the value of sps_persistent_Rice_adaptation_enabled_flag is inferred to be equal to 0. When sps_entropy_coding_sync_enabled_flag is equal to 1, the value of sps_persistent_Rice_adaptation_enabled_flag shall be 0.

At block 1212, the process 1200 involves decoding the binary strings or binary representations of TUs in the CTU into coefficient values based on the calculated Rice parameters, such as through a combination of truncated Rice (TR) and limited k-th order EGK as specified in the VVC specification. At block 1214, the process 1200 involves reconstructing the pixel values for the TUs in the CTU through, for example, reverse quantization and reversion transformation as discussed above with respect to FIG. 2.

At block 1216, the process 1200 involves determining whether the parallel coding is enabled and the CTU is the first CTU of the current CTU row. If so, the process 1200 involves, at block 1218, storing the value of the history counter in a history counter storage variable, as shown in Eqn. (12) or (18). In some examples, such as when the alternative Rice parameter derivation is utilized, the value of the replacement variable HistValue can also be stored in a storage variable as shown in Eqn. (19). At block 1216, the process 1200 involves output the decoded partition of the video.

In another embodiment, the WPP or other parallel coding mechanisms and history-based Rice parameter derivation are prevented to co-exist in a bitstream. For instance, if WPP is enabled, history-based Rice parameter derivation may not be enabled. If WPP is not enabled, the history-based Rice parameter derivation may be enabled. Similarly, if history-based Rice parameter derivation is enabled, WPP may not be enabled. As an example, a syntax change may be made as follows, While in the above description, TUs are described and illustrated in the figures (e.g., FIG. 6), the same techniques can be applied to transform blocks (TBs). In other words, in the embodiments presented above (including the figures), TUs can also represent TBs.

Figure 13:
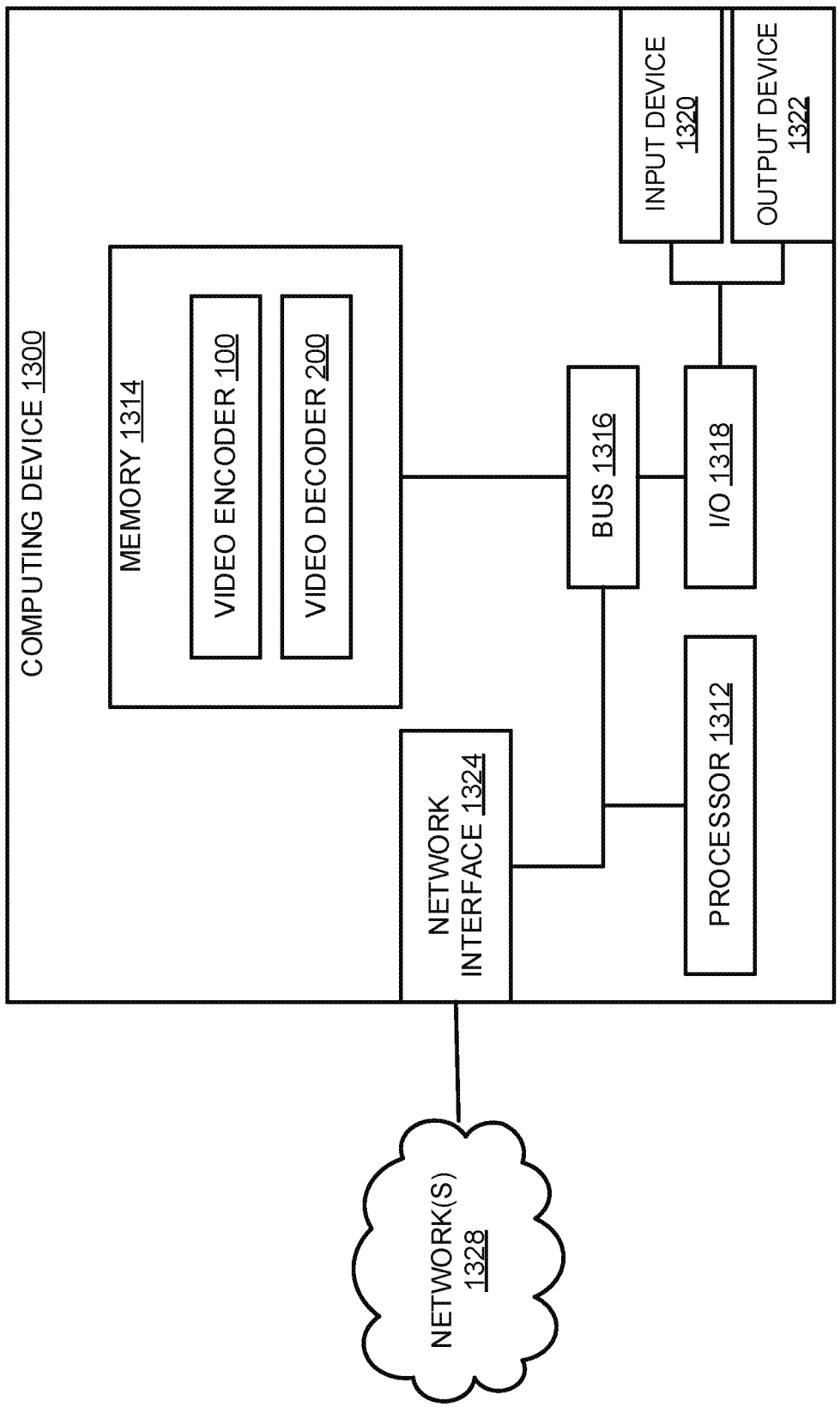
FIG. 13 depicts an example of a computing system that can be used to implement some embodiments of the present disclosure.

Computing System Example for Implementing Dependent Quantization for Video Coding Any suitable computing system can be used for performing the operations described herein. For example, FIG. 13 depicts an example of a computing device 1300 that can implement the video encoder 100 of FIG. 1 or the video decoder 200 of FIG. 2. In some embodiments, the computing device 1300 can include a processor 1312 that is communicatively coupled to a memory 1314 and that executes computer-executable program code and/or accesses information stored in the memory 1314. The processor 1312 may comprise a microprocessor, an application-specific integrated circuit ("ASIC"), a state machine, or other processing device. The processor 1312 can include any of a number of processing devices, including one. Such a processor can include or may be in communication with a computer-readable medium storing instructions that, when executed by the processor 1312, cause the processor to perform the operations described herein.

The memory 1314 can include any suitable non-transitory computer-readable medium. The computer-readable medium can include any electronic, optical, magnetic, or other storage device capable of providing a processor with computer-readable instructions or other program code. Non-limiting examples of a computer-readable medium include a magnetic disk, memory chip, ROM, RAM, an ASIC, a configured processor, optical storage, magnetic tape or other magnetic storage, or any other medium from which a computer processor can read instructions. The instructions may include processor-specific instructions generated by a compiler and/or an interpreter from code written in any suitable computer-programming language, including, for example, C, C++, C#, Visual Basic, Java, Python, Perl, JavaScript, and ActionScript.

The computing device 1300 can also include a bus 1316. The bus 1316 can communicatively couple one or more components of the computing device 1300. The computing device 1300 can also include a number of external or internal devices such as input or output devices. For example, the computing device 1300 is shown with an input/output ("I/O") interface 1318 that can receive input from one or more input devices 1320 or provide output to one or more output devices 1322. The one or more input devices 1320 and one or more output devices 1322 can be communicatively coupled to the I/O interface 1318. The communicative coupling can be implemented via any suitable manner (e.g., a connection via a printed circuit board, connection via a cable, communication via wireless transmissions, etc.). Non-limiting examples of input devices 1320 include a touch screen (e.g., one or more cameras for imaging a touch area or pressure sensors for detecting pressure changes caused by a touch), a mouse, a keyboard, or any other device that can be used to generate input events in response to physical actions by a user of a computing device. Non-limiting examples of output devices 1322 include an LCD screen, an external monitor, a speaker, or any other device that can be used to display or otherwise present outputs generated by a computing device.

The computing device 1300 can execute program code that configures the processor 1312 to perform one or more of the operations described above with respect to FIGS. 1-12. The program code can include the video encoder 100 or the video decoder 200. The program code may be resident in the memory 1314 or any suitable computer-readable medium and may be executed by the processor 1312 or any other suitable processor.

The computing device 1300 can also include at least one network interface device 1324. The network interface device 1324 can include any device or group of devices suitable for establishing a wired or wireless data connection to one or more data networks 1328. Non-limiting examples of the network interface device 1324 include an Ethernet network adapter, a modem, and/or the like. The computing device 1300 can transmit messages as electronic or optical signals via the network interface device 1324.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Some blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude the inclusion of such modifications, variations, and/or additions to the present subject matter as would be readily apparent to one of ordinary skill in the art.

The invention claimed is:

1. A method for decoding a video from a video bitstream encoded using Versatile Video Coding (VVC), the method comprising:
  determining a bit depth of samples of the video based on Sequence Parameter Set (SPS) syntax element sps_bitdepth_minus8, wherein a value of the SPS syntax element sps_bitdepth_minus8 is in a range of 0 to 8;
  determining a size of a decoded picture buffer (DPB) based on a Video Parameter Set (VPS) syntax element vps_ols_dpb_bitdepth_minus8, wherein a value of the VPS syntax element vps_ols_dpb_bitdepth_minus8 is in a range of 0 to 8;
  allocating a storage space with the determined size of the DPB;
  obtaining and storing a decoded picture in the DPB by decoding the video bitstream based on the determined bit depth; and
  outputting the decoded picture,
wherein decoding the video bitstream based on the determined bit depth comprises:

accessing a binary string representing a partition of the video, the partition comprising a plurality of coding tree units (CTUs) forming one or more CTU rows;

for each CTU of the plurality of CTUs in the partition,
prior to decoding the CTU, determining that parallel coding is enabled and that the CTU is the first CTU of a current CTU row among the one or more CTU rows in the partition;
in response to determining that the parallel coding is enabled and that the CTU is the first CTU of the current CTU row in the partition,
setting a history counter for a color component for calculating Rice parameters to an initial value based on the determined bit depth; and
decoding the CTU, comprising:
calculating the Rice parameters for transform units (TUs) in the CTU based on the history counter;
decoding the binary string corresponding to the TUs in the CTU into coefficient values of the TUs based on the calculated Rice parameters; and
determining pixel values for the TUs in the CTU from the coefficient values; and
outputting a decoded partition of the video comprising the decoded plurality of CTUs in the partition.

2. The method of claim 1, wherein obtaining and storing the decoded picture in the DPB by decoding the video bitstream comprises:
obtaining and storing a first set of pictures in the DPB by decoding a first portion of the video bitstream; and
decoding a second portion of the video bitstream into a second set of pictures by using the first set of pictures in the DPB as reference pictures.

3. The method of claim 1, further comprising:
reordering one or more decoded pictures in the DPB according to an output order; and
outputting the one or more decoded pictures according to the output order.

4. The method of claim 1, further comprising:
holding one or more decoded pictures in the DPB for a period of time; and
outputting the one or more decoded pictures after the period of time has passed.

5. A non-transitory computer-readable medium having program code that is stored thereon, the program code executable by one or more processing devices for performing operations comprising:
determining a size of a decoded picture buffer (DPB) for a video based on a Video Parameter Set (VPS) syntax element vps_ols_dpb_bitdepth_minus8 included in a video bitstream of the video, wherein the video bitstream is encoded using Versatile Video Coding (VVC) and a value of the VPS syntax element vps_ols_dpb_bitdepth_minus8 is in a range of 0 to 8;
allocating a storage space with the determined size of the DPB;
obtaining and storing a decoded picture in the DPB by decoding the video bitstream; and
outputting the decoded picture,
wherein the operations further comprise:
determining a bit depth of samples of the video based on a Sequence Parameter Set (SPS) syntax element sps_bitdepth_minus8, wherein a value of the SPS syntax element sps_bitdepth_minus8 is in a range of 0 to 8, wherein decoding the video bitstream is performed based on the determined bit depth,
wherein decoding the video bitstream based on the determined bit depth comprises:

accessing a binary string representing a partition of the video, the partition comprising a plurality of coding tree units (CTUs) forming one or more CTU rows; and for each CTU of the plurality of CTUs in the partition,
prior to decoding the CTU and in response to determining that parallel coding is enabled and that the CTU is the first CTU of a current CTU row, determining whether the current CTU row is the first CTU row in the partition;
in response to determining that the current CTU row is the first CTU row in the partition, setting a history counter for a color component for calculating Rice parameters to an initial value based on the determined bit depth;
in response to determining that the current CTU row is not the first CTU row in the partition, setting the history counter for a color component to a value stored in a history counter storage variable;
decoding the CTU, comprising:
calculating the Rice parameters for transform units (TUs) in the CTU based on the value of the history counter;
decoding the binary string corresponding to the TUs in the CTU into coefficient values of the TUs based on the calculated Rice parameters; and
determining pixel values for the TUs in the CTU from the coefficient values; and
after decoding the CTU, in response to determining that parallel coding is enabled and that the CTU is the first CTU of the current CTU row, storing a current value of the history counter in the history counter storage variable.

6. The non-transitory computer-readable medium of claim 5, wherein obtaining and storing the decoded picture in the DPB by decoding the video bitstream comprises:
obtaining and storing a first set of pictures in the DPB by decoding a first portion of the video bitstream; and
decoding a second portion of the video bitstream into a second set of pictures by using the first set of pictures in the DPB as reference pictures.

7. The non-transitory computer-readable medium of claim 5, wherein the operations further comprise:
reordering one or more decoded pictures in the DPB according to an output order; and
outputting the one or more decoded pictures according to the output order.

8. The non-transitory computer-readable medium of claim 5, wherein the operations further comprise:
holding one or more decoded pictures in the DPB for a period of time; and
outputting the one or more decoded pictures after the period of time has passed.

9. A system comprising:
a processing device; and
a non-transitory computer-readable medium communicatively coupled to the processing device, wherein the processing device is configured to execute program code stored in the non-transitory computer-readable medium and thereby perform operations comprising:
determining a size of a decoded picture buffer (DPB) for a video based on a Video Parameter Set (VPS) syntax element vps_ols_dpb_bitdepth_minus8 included in a video bitstream of the video, wherein the video bitstream is encoded using Versatile Video Coding (VVC) and a value of the VPS syntax element vps_ols_dpb_bitdepth_minus8 is in a range of 0 to 8;

allocating a storage space with the determined size of the DPB;

obtaining and storing a decoded picture in the DPB by decoding the video bitstream; and outputting the decoded picture, wherein the operations further comprise:

determining a bit depth of samples of the video based on a Sequence Parameter Set (SPS) syntax element sps_bitdepth_minus8, wherein a value of the SPS syntax element sps_bitdepth_minus8 is in a range of 0 to 8, wherein decoding the video bitstream is performed based on the determined bit depth, wherein decoding the video bitstream based on the determined bit depth comprises:

accessing a binary string representing a partition of the video, the partition comprising a plurality of coding tree units (CTUs) forming one or more CTU rows;

for each CTU of the plurality of CTUs in the partition, prior to decoding the CTU, determining that parallel coding is enabled and that the CTU is the first CTU of a current CTU row among the one or more CTU rows in the partition;

in response to determining that the parallel coding is enabled and that the CTU is the first CTU of the current CTU row in the partition, setting a history counter for a color component for calculating Rice parameters to an initial value based on the determined bit depth; and decoding the CTU, comprising:

calculating the Rice parameters for transform units (TUs) in the CTU based on the history counter:

decoding the binary string corresponding to the TUs in the CTU into coefficient values of the TUs based on the calculated Rice parameters; and determining pixel values for the TUs in the CTU from the coefficient values; and outputting a decoded partition of the video comprising the decoded plurality of CTUs in the partition.

10. The system of claim 9, wherein obtaining and storing the decoded picture in the DPB by decoding the video bitstream comprises:

obtaining and storing a first set of pictures in the DPB by decoding a first portion of the video bitstream; and decoding a second portion of the video bitstream into a second set of pictures by using the first set of pictures in the DPB as reference pictures.

11. The system of claim 9, wherein the operations further comprise:

reordering one or more decoded pictures in the DPB according to an output order; and outputting the one or more decoded pictures according to the output order.

12. The system of claim 9, wherein the operations further comprise:

holding the one or more decoded pictures in the DPB for a period of time; and outputting the one or more decoded pictures after the period of time has passed.

* * * * *